(12) United States Patent
Ito et al.

(10) Patent No.: US 11,109,948 B2
(45) Date of Patent: Sep. 7, 2021

(54) WORKPIECE UNIT AND METHOD OF PRODUCING SAME

(71) Applicant: KURARAY NORITAKE DENTAL INC., Kurashiki (JP)

(72) Inventors: Yoshihisa Ito, Miyoshi (JP); Tetsuo Yamada, Nagoya (JP)

(73) Assignee: KURARAY NORITAKE DENTAL INC., Kurashiki (JP)

( * ) Notice: Subject to any disclaimer, the term of this patent is extended or adjusted under 35 U.S.C. 154(b) by 157 days.

(21) Appl. No.: 15/559,335

(22) PCT Filed: Mar. 18, 2016

(86) PCT No.: PCT/JP2016/058765
§ 371 (c)(1),
(2) Date: Sep. 18, 2017

(87) PCT Pub. No.: WO2016/148287
PCT Pub. Date: Sep. 22, 2016

(65) Prior Publication Data
US 2018/0110598 A1    Apr. 26, 2018

(30) Foreign Application Priority Data
Mar. 19, 2015  (JP) .............................. JP2015-056570

(51) Int. Cl.
*A61C 13/083*    (2006.01)
*B23Q 3/10*    (2006.01)
(Continued)

(52) U.S. Cl.
CPC .............. *A61C 13/083* (2013.01); *A61C 5/77* (2017.02); *A61C 7/14* (2013.01); *A61C 8/00* (2013.01);
(Continued)

(58) Field of Classification Search
CPC ............ A61C 13/0003; A61C 13/0022; A61C 13/083; A61C 5/77; A61C 7/14;
(Continued)

(56) References Cited

U.S. PATENT DOCUMENTS 7,604,759 B2    10/2009    Gubler et al.
8,141,217 B2    3/2012    Gubler et al.
(Continued)

FOREIGN PATENT DOCUMENTS

DE    20316004 U1 *    3/2004    ......... A61C 13/0004
DE    10 2007 013 675 A1    10/2008
(Continued)

OTHER PUBLICATIONS

DE 202013103515 U1—English Machine Translation (Year: 2013).*
(Continued)

*Primary Examiner* — Marc Carlson
(74) *Attorney, Agent, or Firm* — Oblon, McClelland, Maier & Neustadt, L.L.P.

(57) ABSTRACT

Disclosed herein is a workpiece unit containing a workpiece body, and a holding member which is arranged at least at a part of an outer circumferential portion of the workpiece body and directly contacts with at least a part of the outer circumferential portion.

17 Claims, 20 Drawing Sheets

(51) Int. Cl.
*B23P 11/02* (2006.01)
*A61C 5/77* (2017.01)
*B24B 41/06* (2012.01)
*A61C 8/00* (2006.01)
*A61C 7/14* (2006.01)
*A61C 13/00* (2006.01)

(52) U.S. Cl.
CPC ...... *A61C 13/0003* (2013.01); *A61C 13/0022* (2013.01); *B23P 11/02* (2013.01); *B23Q 3/10* (2013.01); *B24B 41/06* (2013.01)

(58) Field of Classification Search
CPC .. A61C 8/00; B23P 11/02; B23Q 3/10; B24B 41/06
See application file for complete search history.

(56) References Cited

U.S. PATENT DOCUMENTS

| | | | |
|---|---|---|---|
| 8,506,294 B2 | 8/2013 | Althoff et al. | |
| 9,212,065 B2* | 12/2015 | Yamada | C01G 25/02 |
| 10,327,874 B2* | 6/2019 | Kutzner | A61C 13/0022 |
| 2003/0132539 A1 | 7/2003 | Althoff et al. | |
| 2007/0275352 A1 | 11/2007 | Gubler et al. | |
| 2010/0028836 A1 | 2/2010 | Gubler et al. | |
| 2014/0328746 A1 | 11/2014 | Yamada et al. | |
| 2016/0206411 A1 | 7/2016 | Kutzner et al. | |
| 2018/0064515 A1* | 3/2018 | Ito | A61C 7/14 |
| 2018/0243054 A1* | 8/2018 | Ito | A61C 7/14 |
| 2018/0243055 A1* | 8/2018 | Ito | A61C 7/14 |

FOREIGN PATENT DOCUMENTS

| | | | | |
|---|---|---|---|---|
| DE | 102007013675 A1 | * | 10/2008 | ......... A61C 13/0022 |
| DE | 20 2010 001 125 U1 | | 4/2010 | |
| DE | 202013103515 U1 | * | 9/2013 | ......... A61C 13/0022 |
| DE | 202016007641 U1 | * | 3/2018 | ............. A61C 13/00 |
| EP | 3 045 145 A2 | | 7/2016 | |
| JP | 61-146404 A | | 7/1986 | |
| JP | 3-36135 U | | 4/1991 | |
| JP | 2006-521842 A | | 9/2006 | |
| JP | 2007-54651 A | | 3/2007 | |
| JP | 2013-119485 A | | 6/2013 | |
| JP | 2014-218389 A | | 11/2014 | |
| WO | WO 95/30382 A1 | | 11/1995 | |
| WO | WO 2013/117540 A1 | | 6/2013 | |

OTHER PUBLICATIONS

International Search Report dated May 24, 2016, in PCT/JP2016/058765 filed Mar. 18, 2016.
International Preliminary Report on Patentability and Written Opinion dated Sep. 28, 2017 in PCT/JP2016/058765 filed Mar. 18, 2016 (English translation).
Extended European Search Report dated Sep. 12, 2018 in corresponding European Patent Application No. 16765116.5, 7 pages.
Japanese Office Action issued in Japanese Patent Application No. 2020-124678 dated Jul. 27, 2021, (w/ English Translation).

* cited by examiner

[Fig. 1]
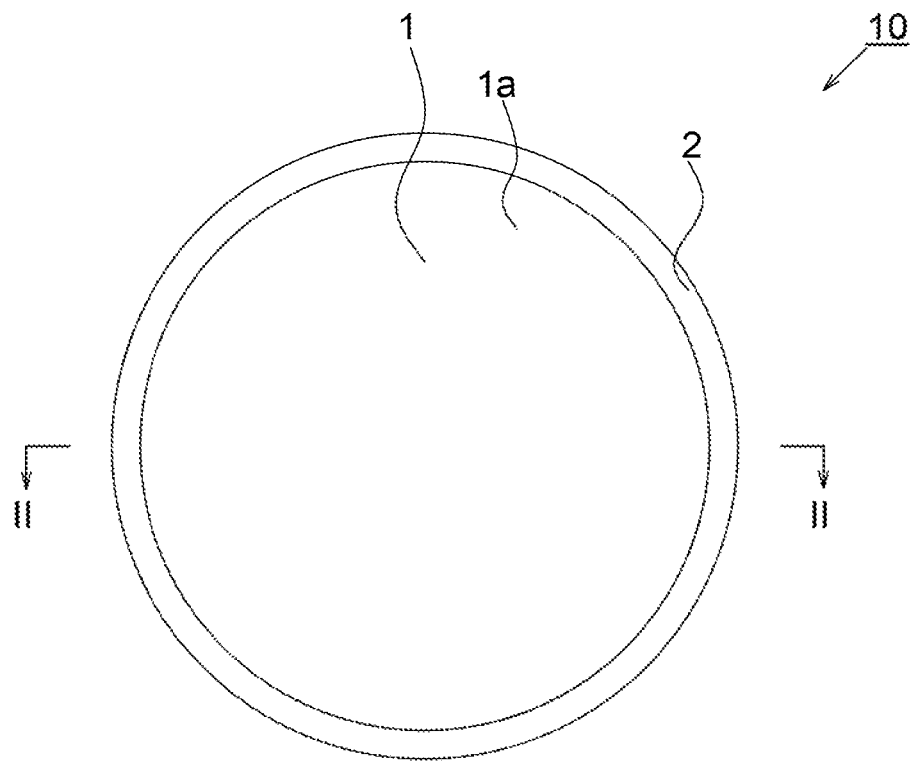
[Fig. 2]
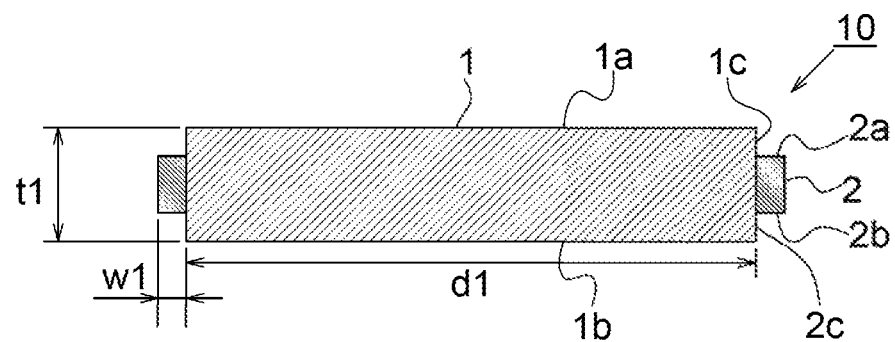

[Fig. 3]
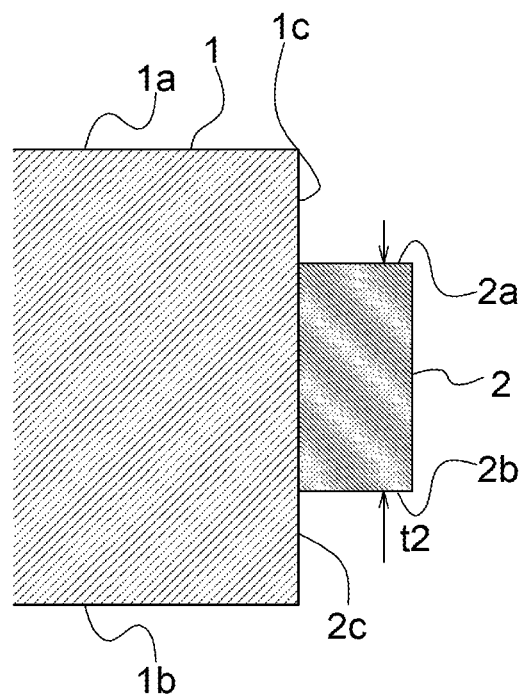
[Fig. 4]
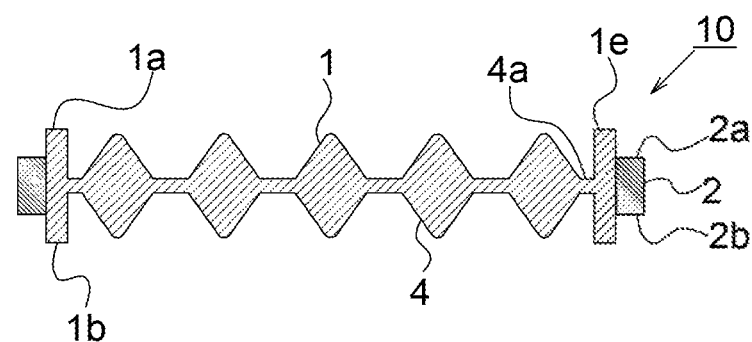

[Fig. 5]
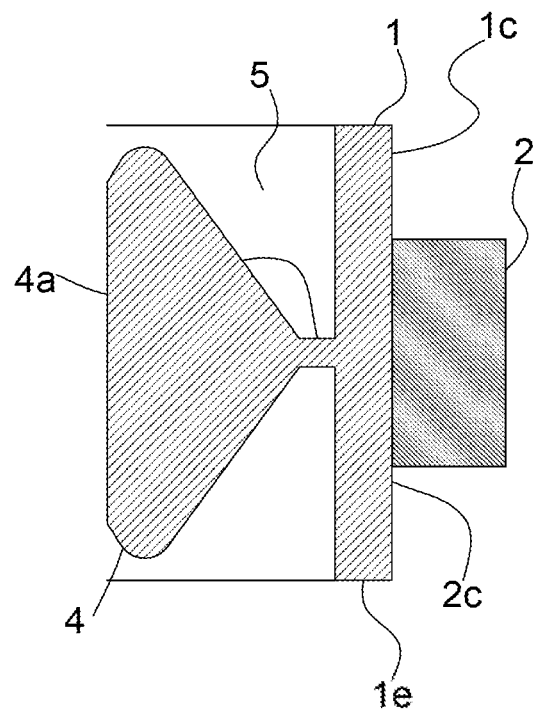
[Fig. 6]
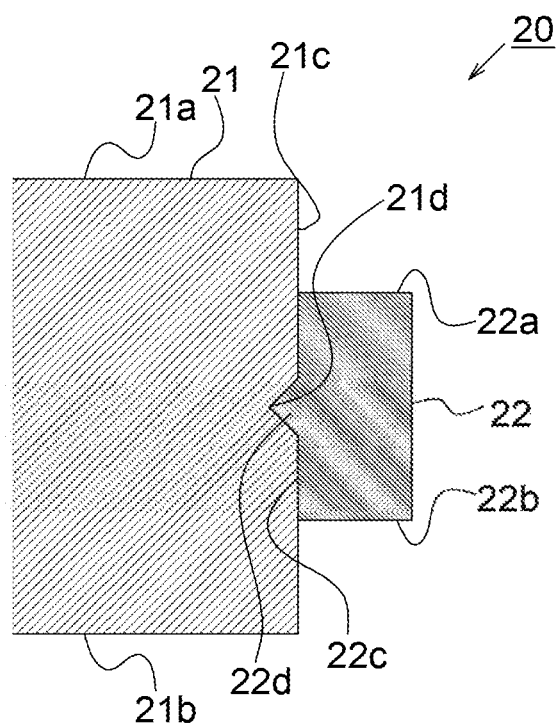

[Fig. 7]
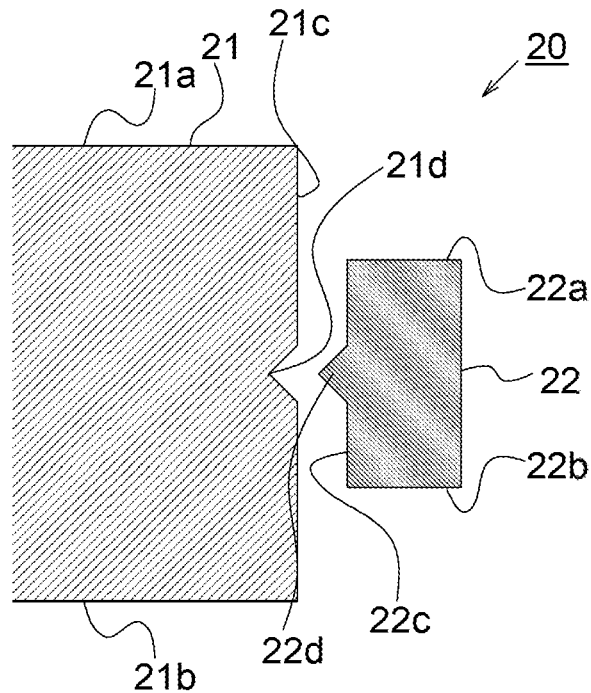
[Fig. 8]
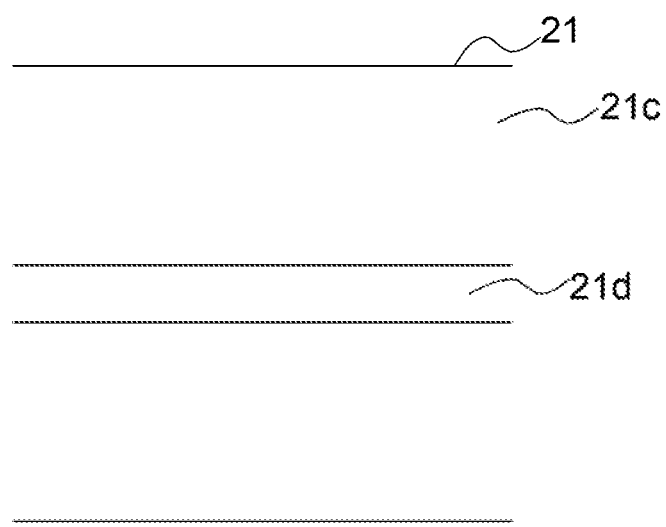

[Fig. 9]
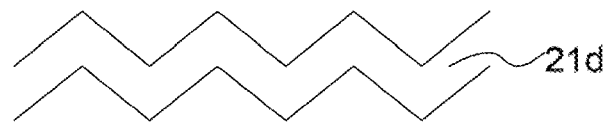
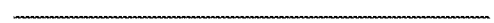
[Fig. 10]
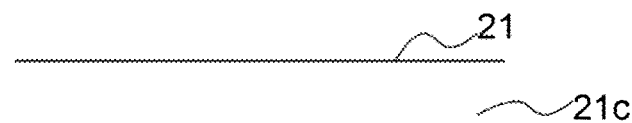
[Fig. 11]
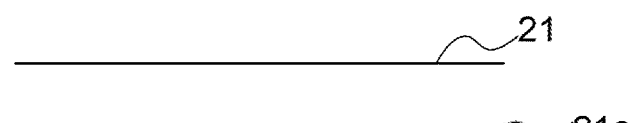
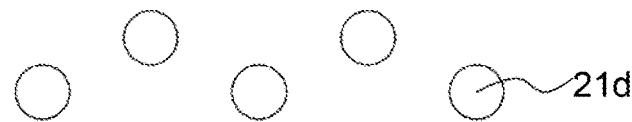

[Fig. 12]
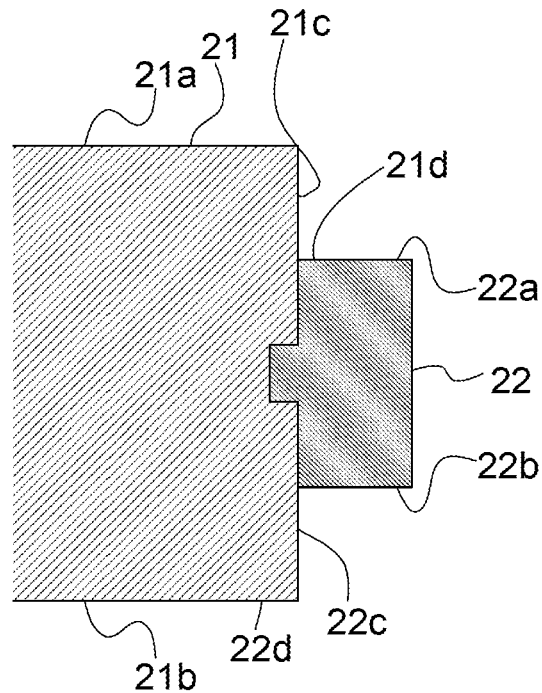
[Fig. 13]
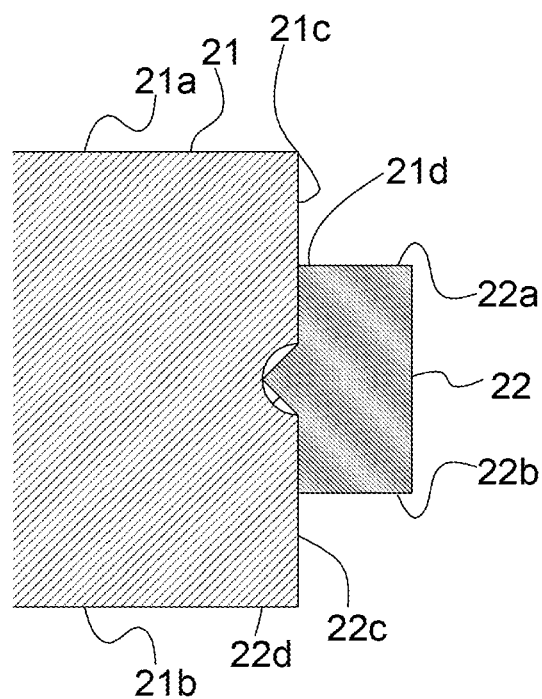

[Fig. 14]
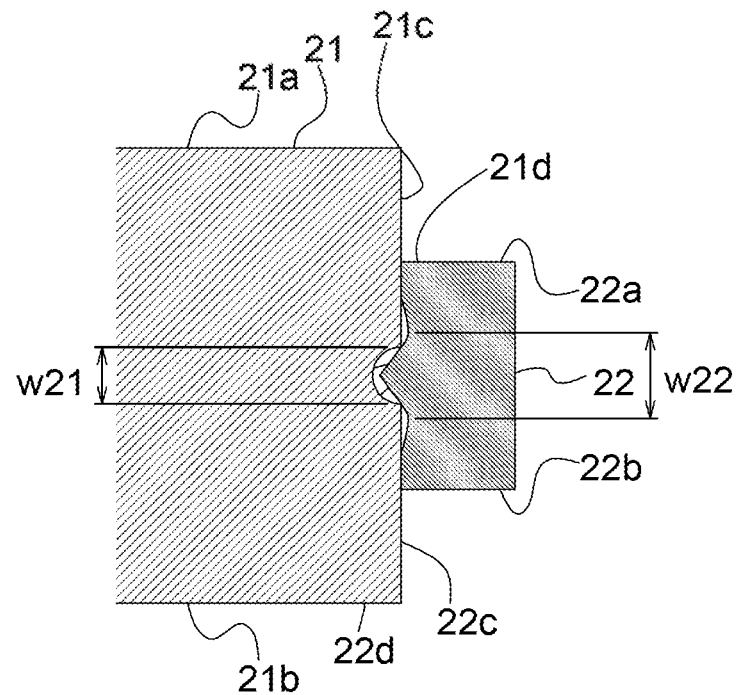
[Fig. 15]
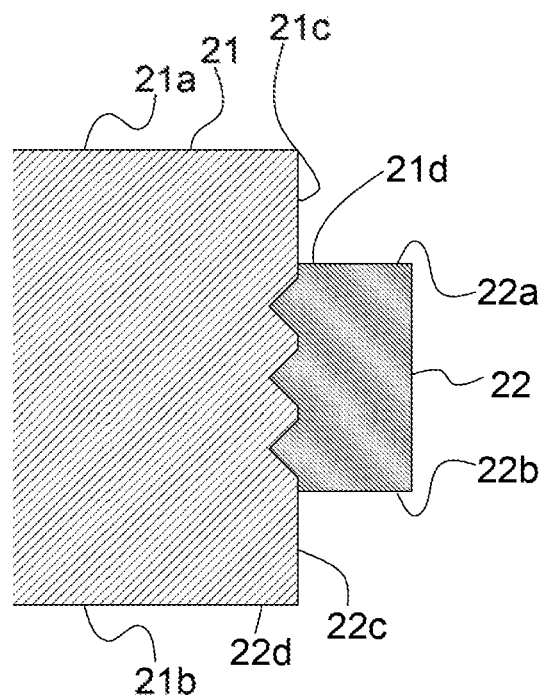

[Fig. 16]
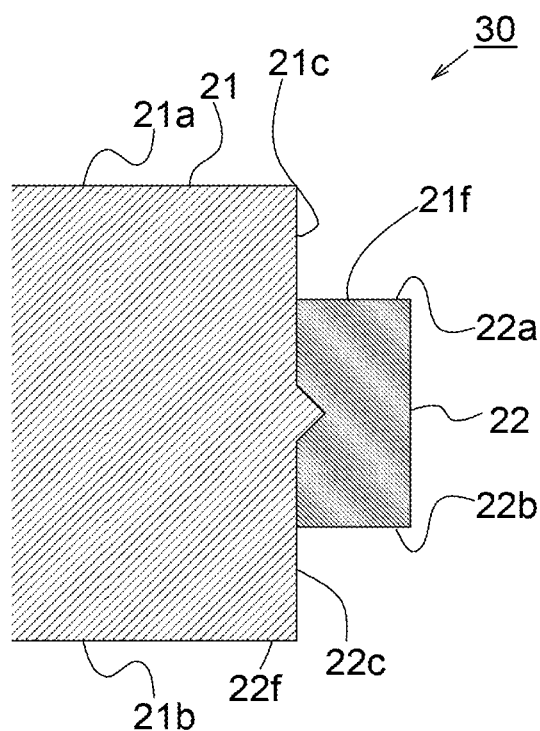
[Fig. 17]
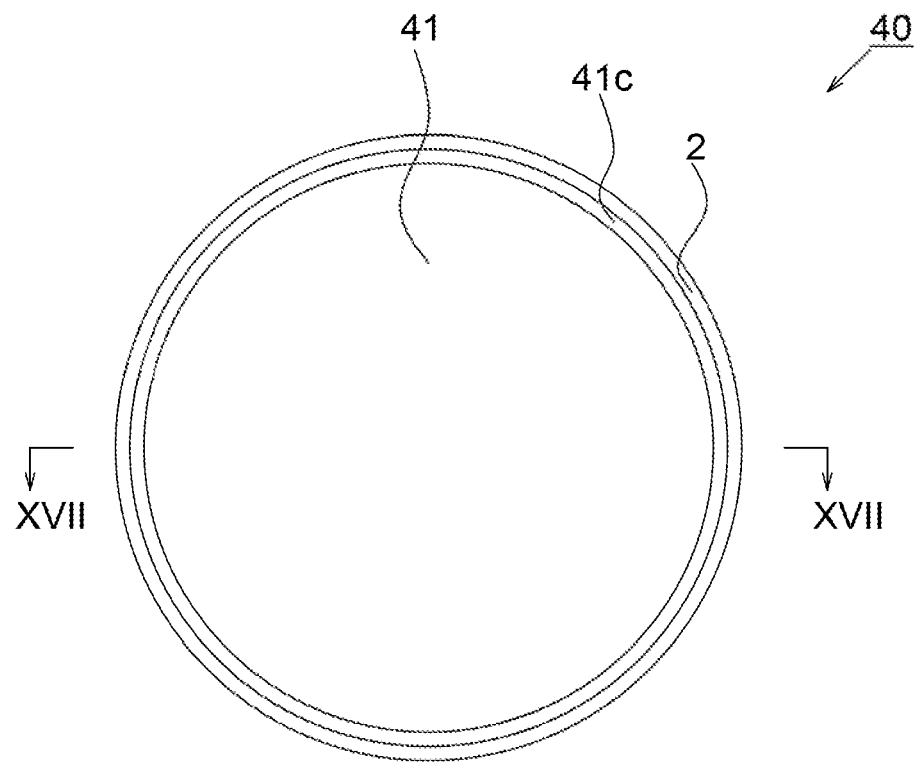

[Fig. 18]
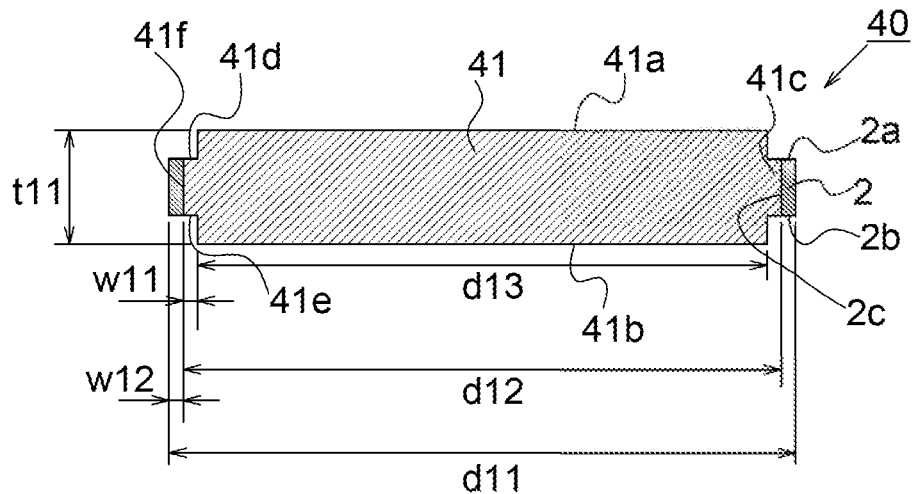
[Fig. 19]
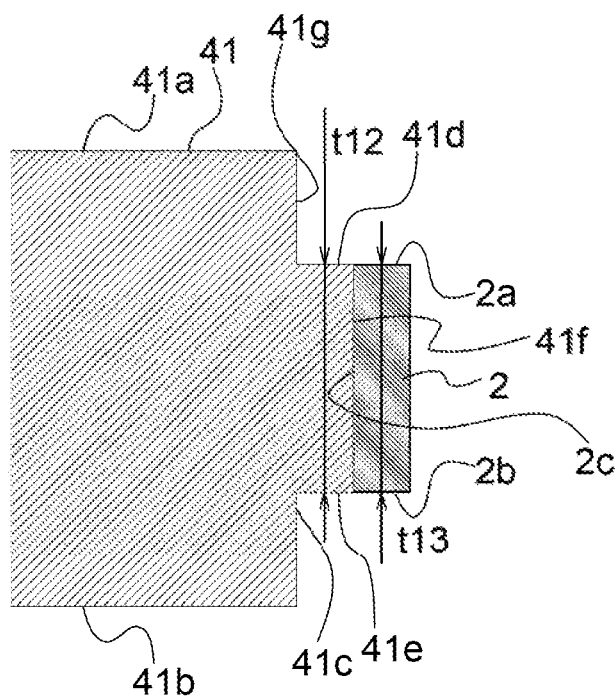

[Fig. 20]
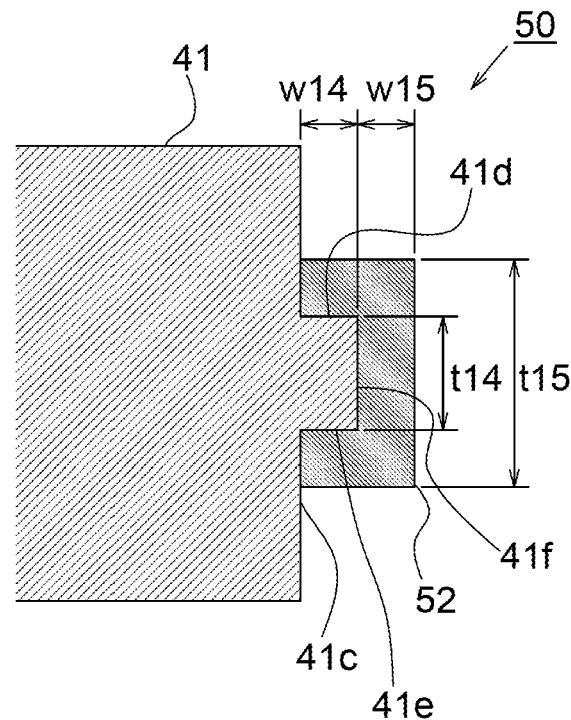
[Fig. 21]
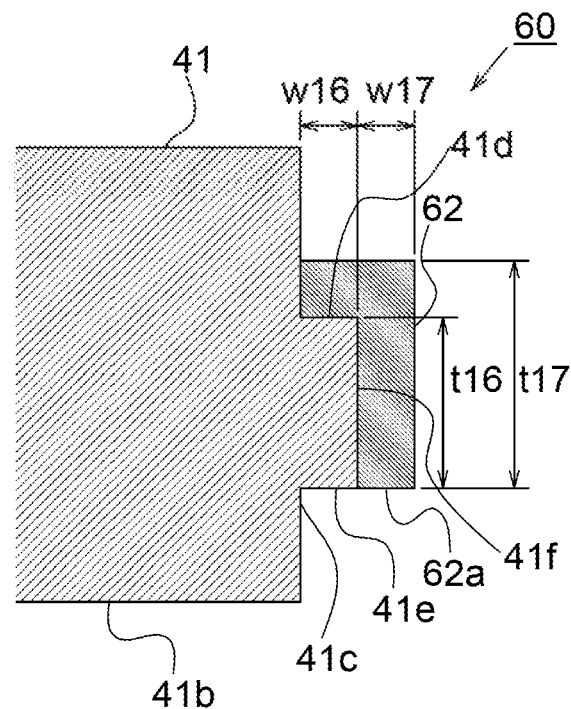

[Fig. 22]
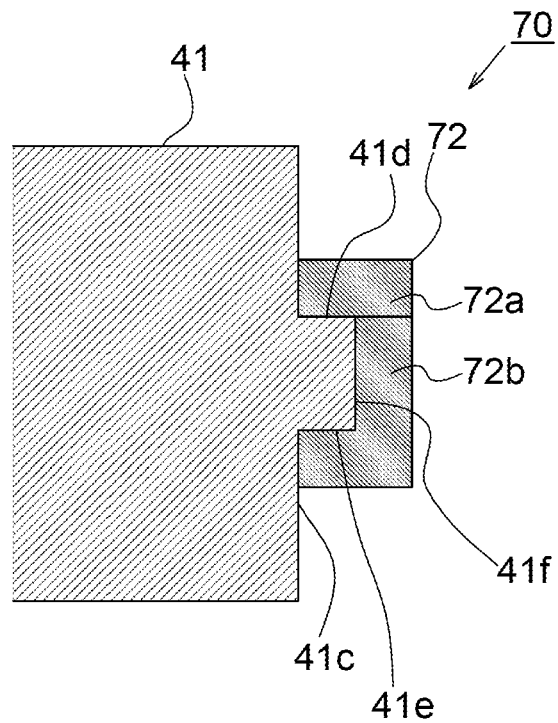
[Fig. 23]
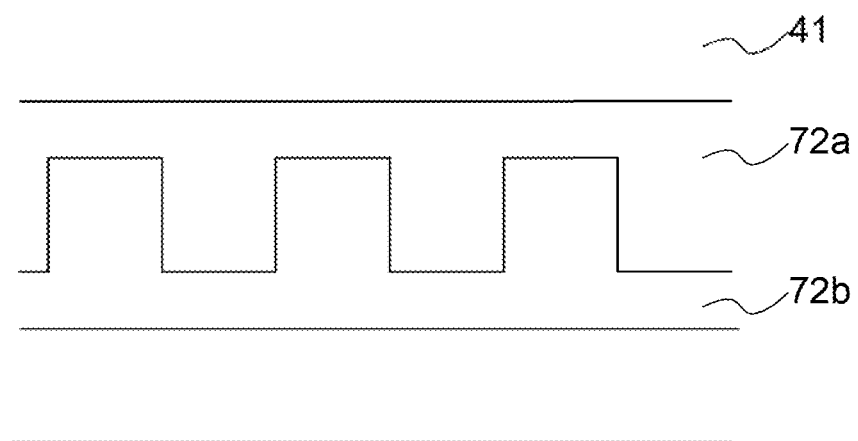

[Fig. 24]
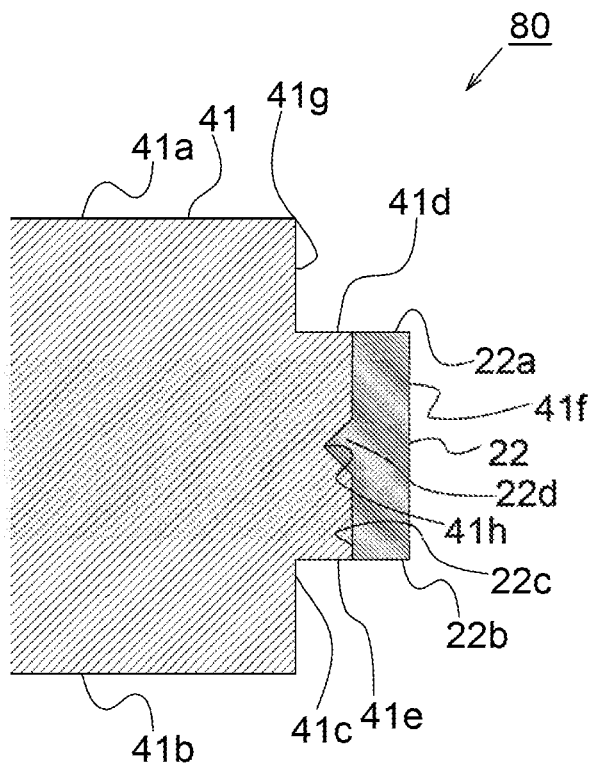
[Fig. 25]
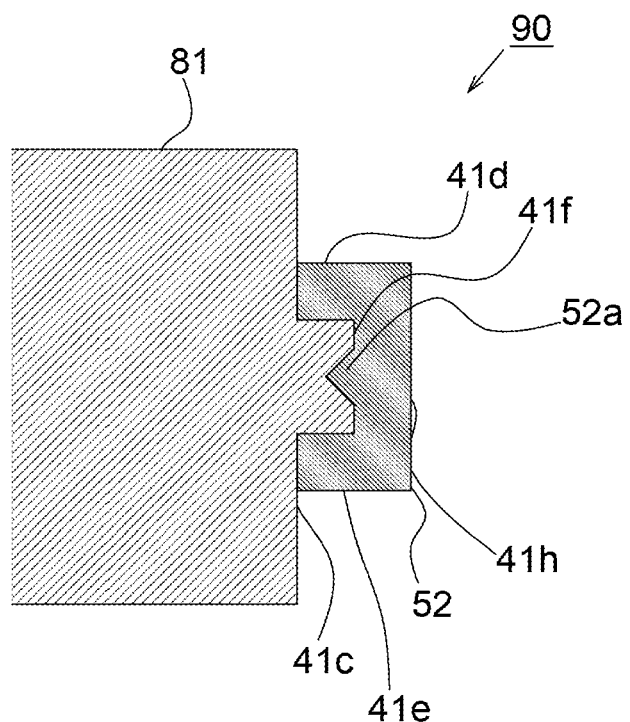

[Fig. 26]
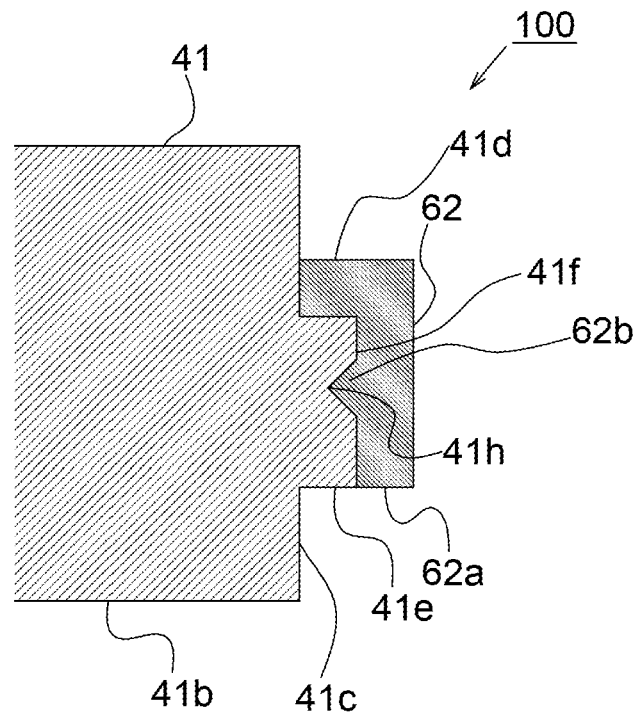
[Fig. 27]
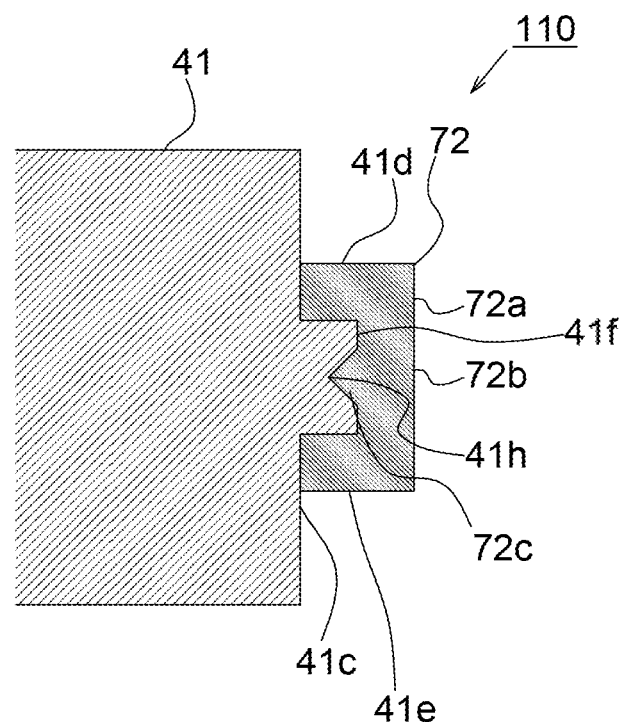

[Fig. 28]
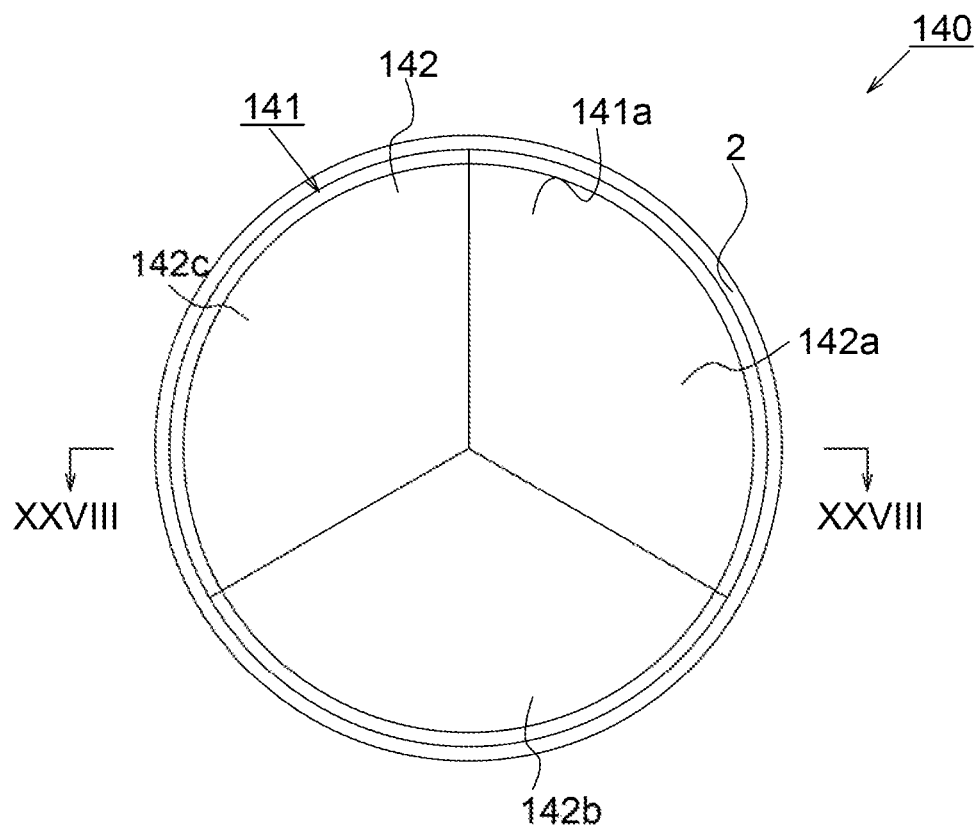
[Fig. 29]
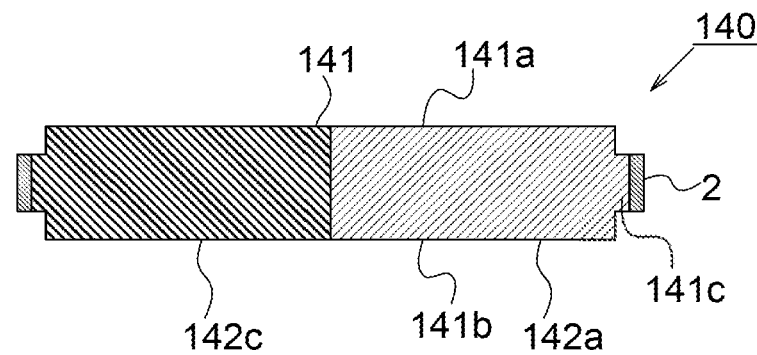

[Fig. 30]
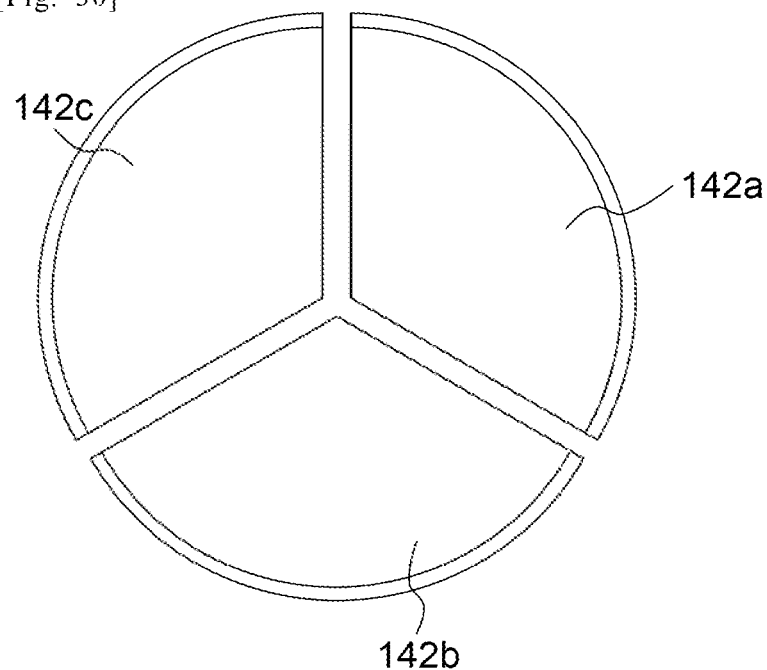
[Fig. 31]
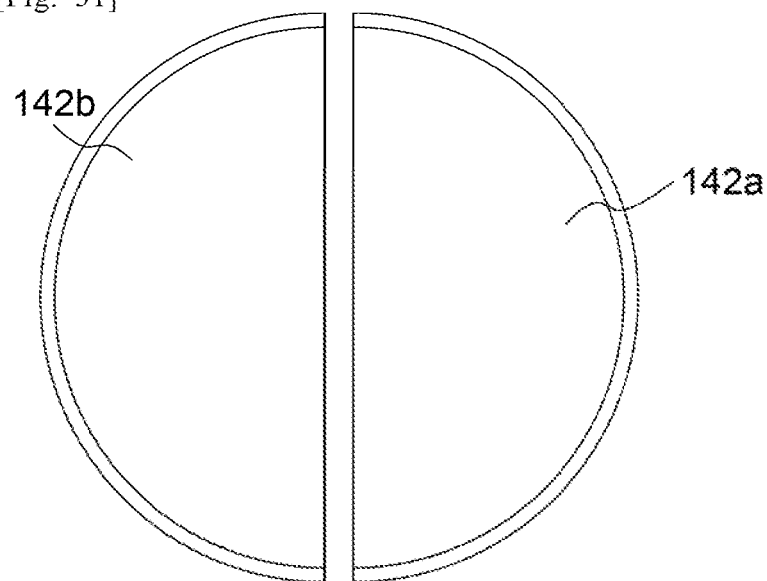

[Fig. 32]
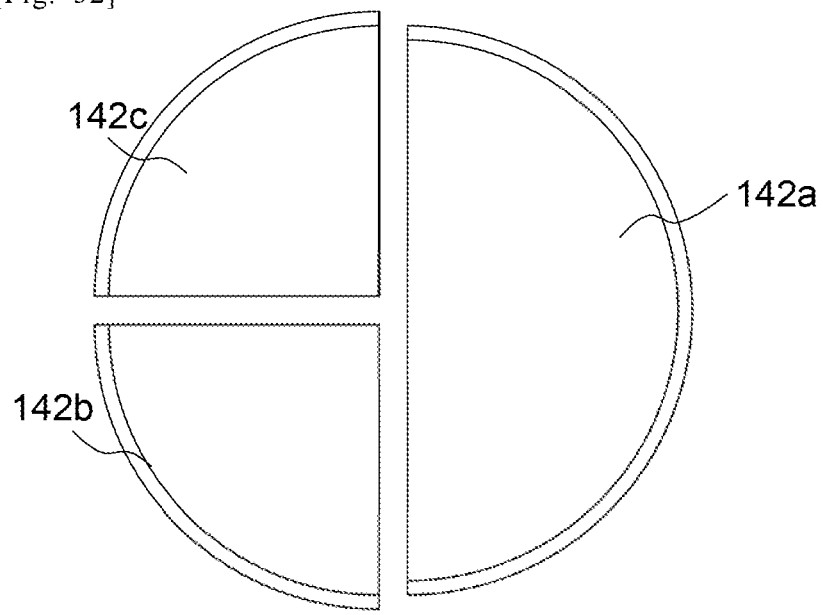
[Fig. 33]
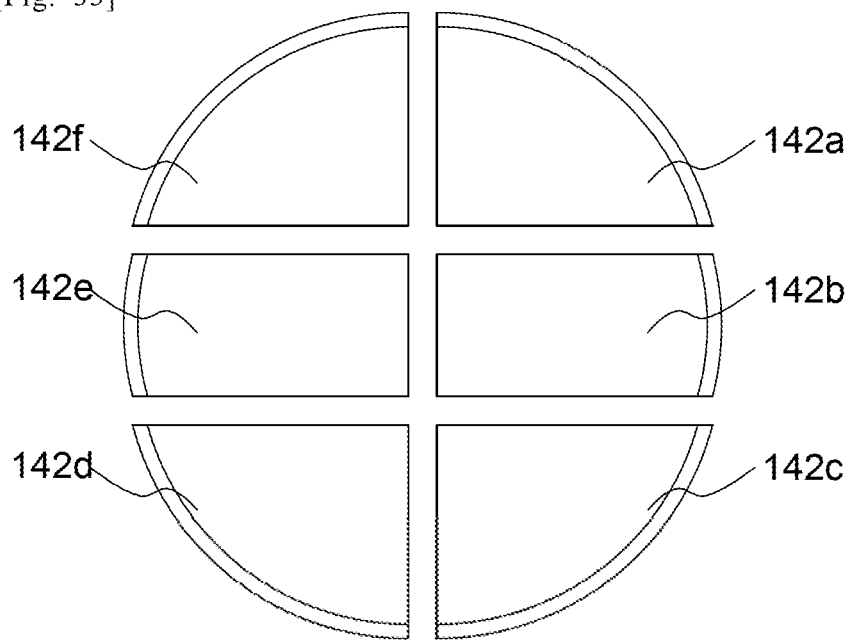

[Fig. 34]
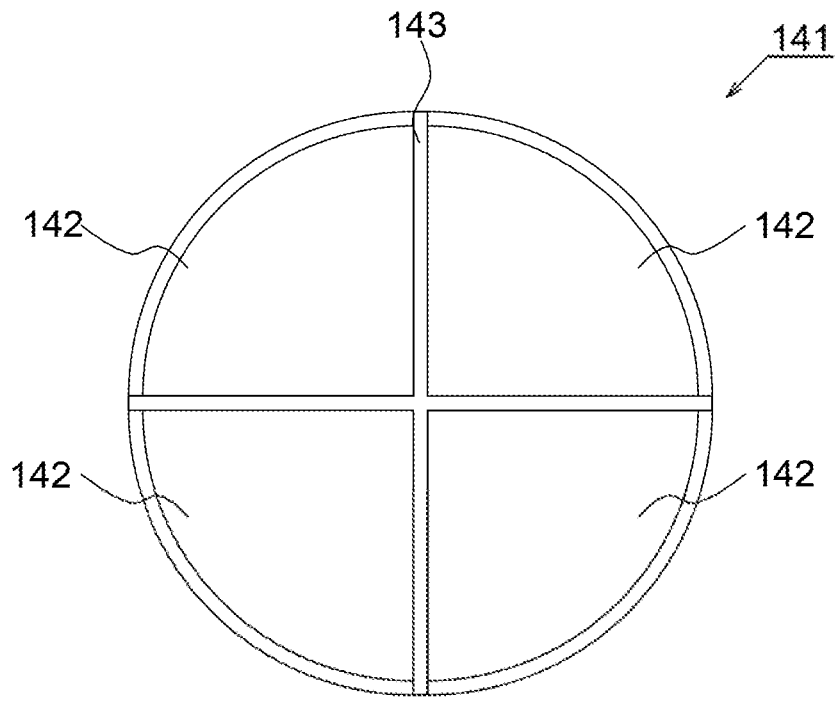
[Fig. 35]
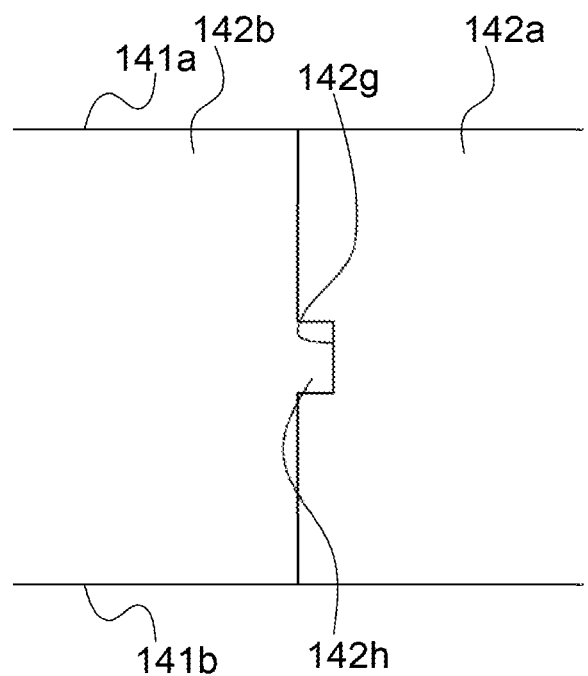

[Fig. 36]
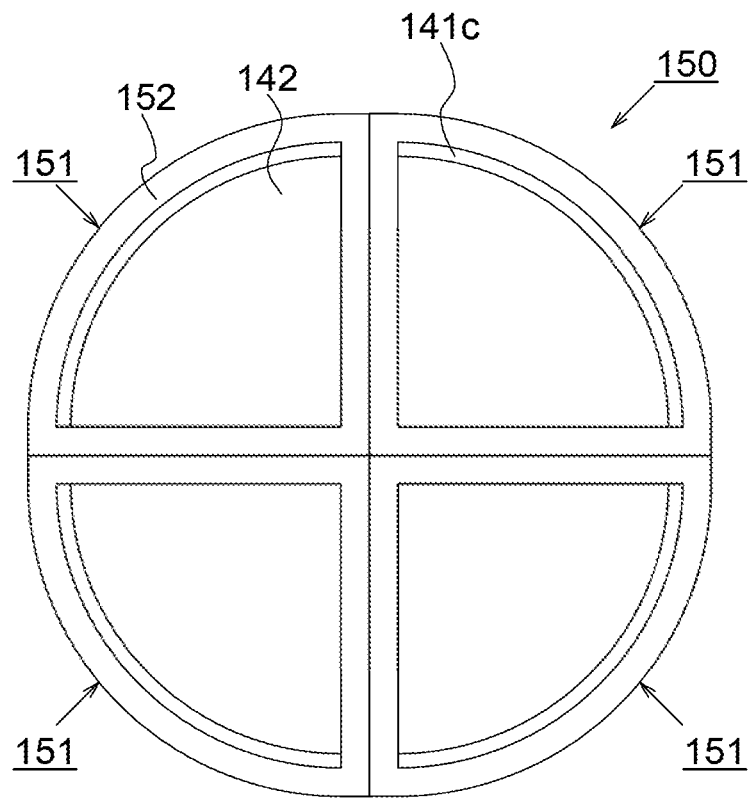
[Fig. 37]
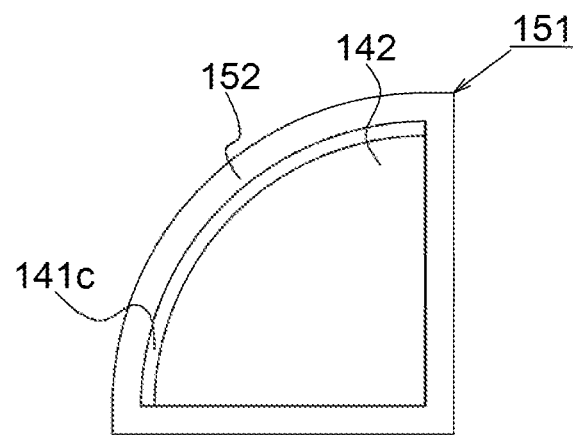

[Fig. 38]
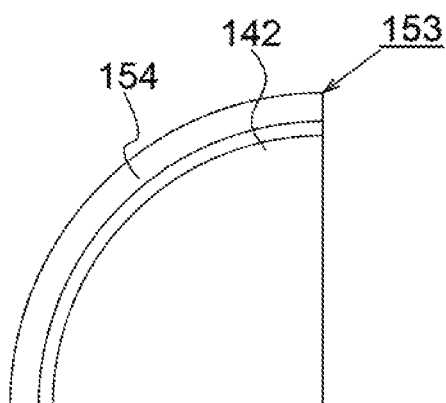
[Fig. 39]
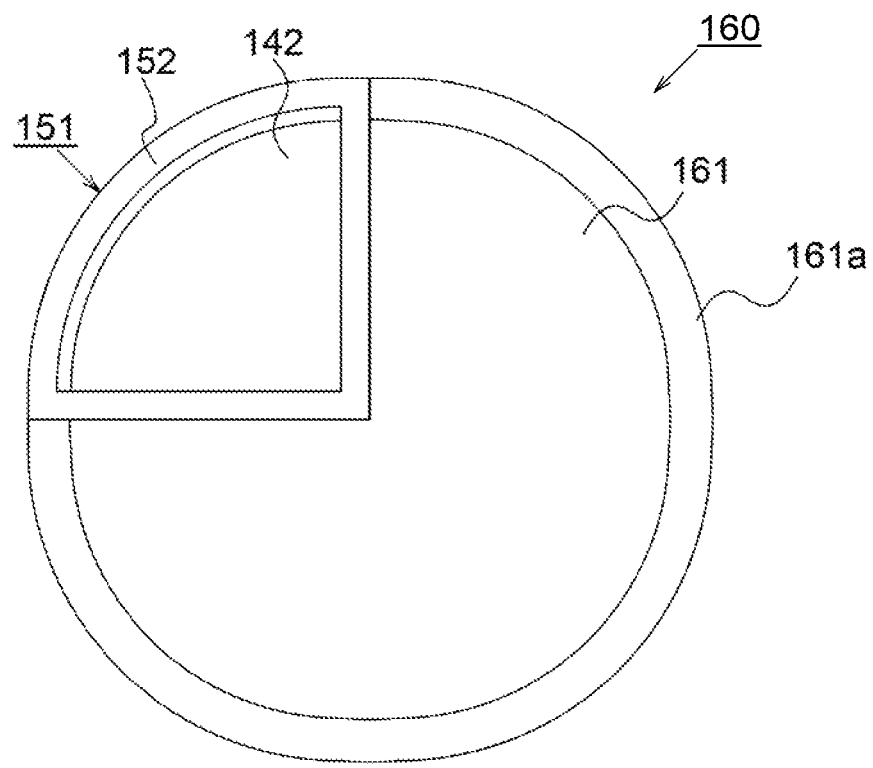

[Fig. 40]
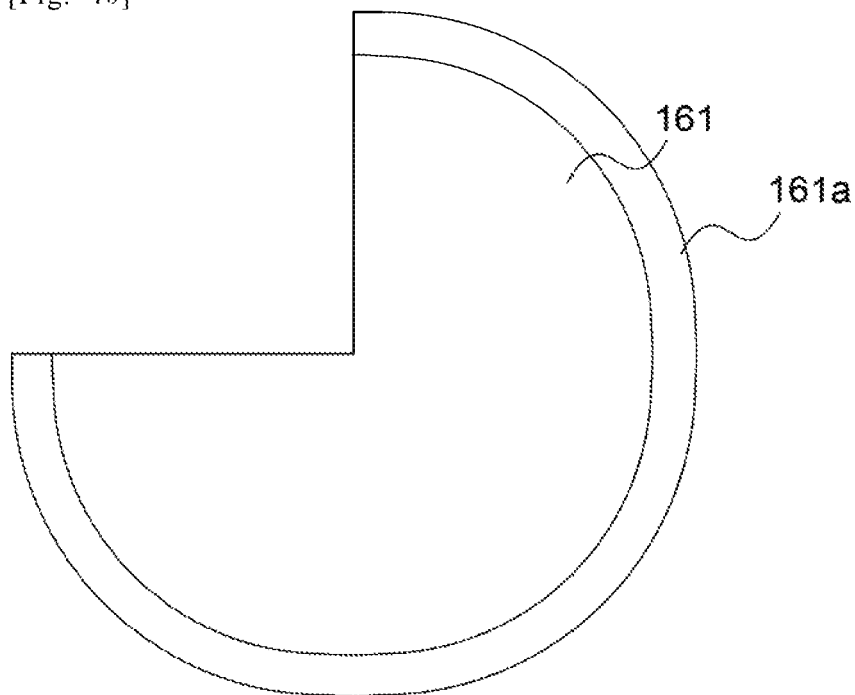
[Fig. 41]
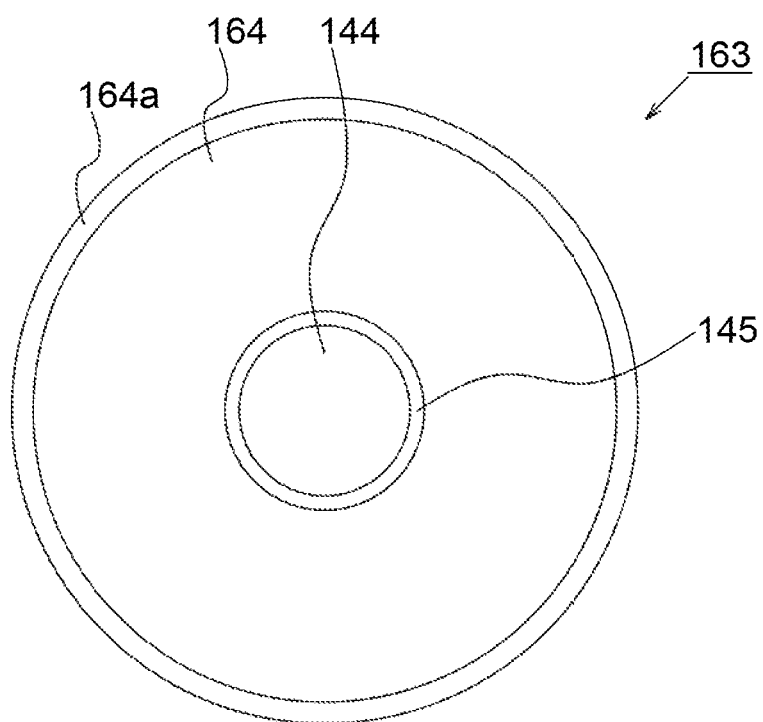

WORKPIECE UNIT AND METHOD OF PRODUCING SAME

REFERENCE TO RELATED APPLICATION

The present invention is based upon Japanese patent application No. 2015-056570 (filed on Mar. 19, 2015), the disclosure of which is incorporated herein in its entirety by reference thereto.

The present invention relates to a workpiece unit comprising a workpiece body for performing machining process, and a method of producing same.

BACKGROUND

In a case of machining a workpiece body such as ceramic, metal etc. into a three-dimensional shape, a workpiece unit is machined in such a state that its end portion is held. This workpiece body is referred to also as "blank". For example in the field of dentistry, prosthesis is formed by machining zirconia of a disc shape as a workpiece body in such a state that the outer edge region of the disc is held by means of a working apparatus.

Accordingly, in a method of producing dental prosthesis as disclosed in Patent Literature 1, a blank is fixed to a working apparatus in such a manner that a ring is attached at the outer edge of the blank by means of an adhesive and the ring is fixed at a chuck of the working apparatus.

CITATION LIST

Patent Literatures

PTL 1: International Publication WO95/30382

SUMMARY

Technical Problem

The following analyses are given in view of the present invention.

In working a workpiece body (blank) of a disc shape as disclosed in PTL1, a workpiece body is machined in such a manner that its outer edge portion is left in a frame shape, as a result of which a worked item of interest is formed in such a state that it is connected to the outer edge portion. In order to use a workpiece body without any waste, the workpiece body is worked close up to its outer edge. That is, the outer edge portion of a workpiece body left after working is thin and weak in strength. In the method of producing a dental prosthesis disclosed in PTL1, a holding member (ring) is attached at a workpiece body via an adhesive. In general, holding members are greater than workpiece bodies in thermal expansion coefficient. Thus, stress of the holding member during its expansion at a high temperature is transmitted to the workpiece body via the adhesive, as a result of which the workpiece body may be broken at its portion whose strength has been weakened. For example, a workpiece unit after working process may be exposed to a high temperature in a vehicle in transit, and then the workpiece body may be broken.

Further, even if it is desired that a holding member is removed from a workpiece body after working, existence of an adhesive makes it difficult to remove the holding member from the workpiece body.

Therefore, it is desired that a holding member is attached to a workpiece body without using any adhesive.

Solution to Problem

According to a first aspect of the present invention, a workpiece unit (workpiece assembly) comprises a workpiece body (to-be-worked body), and a holding member which is arranged on at least a part of an outer circumferential portion of the workpiece body and directly contacts with at least a part of the outer circumferential portion.

According to a second aspect of the present invention, a method of producing a workpiece unit comprises the following steps: preparing a workpiece body, preparing a holding member of a ring shape, expanding the holding member by heating, inserting the workpiece body into the ring of the holding member, and mounting the holding member at the outer circumferential portion of the workpiece body by contracting the holding member by cooling.

Advantageous Effects of Invention

It can be achieved to prevent, even under such a condition that a workpiece body and a holding member are different from each other in thermal expansion rate, transmission of stress to the workpiece body via an adhesive, the stress being caused by difference between their extensions by thermal expansion. As a result, it is possible to prevent breakage of a workpiece body.

Further, it is possible to easily remove a holding member from a workpiece body.

BRIEF DESCRIPTION OF THE DRAWINGS

FIG. 1 is a schematic plan view of a workpiece unit according to a first exemplary embodiment of the present disclosure.

FIG. 2 is a schematic cross-sectional view of the workpiece unit taken along line II-II of FIG. 1.

FIG. 3 is a schematic partial cross-sectional view of the workpiece unit according to the first exemplary embodiment of the present disclosure.

FIG. 4 is a schematic cross-sectional view of the workpiece unit after working according to the first exemplary embodiment of the present disclosure.

FIG. 5 is a schematic partial cross-sectional view of the workpiece unit after working according to the first exemplary embodiment of the present disclosure.

FIG. 6 is a schematic partial cross-sectional view of a workpiece unit according to a second exemplary embodiment of the present disclosure.

FIG. 7 is a schematic exploded view of the workpiece unit according to the second exemplary embodiment of the present disclosure.

FIG. 8 is a schematic plan view showing an example of a first positioning part and a second positioning part.

FIG. 9 is a schematic plan view showing an example of a first positioning part and a second positioning part.

FIG. 10 is a schematic plan view showing an example of a first positioning part and a second positioning part.

FIG. 11 is a schematic plan view showing an example of a first positioning part and a second positioning part.

FIG. 12 is a schematic cross-sectional view showing an example of a first positioning part and a second positioning part.

FIG. 13 is a schematic cross-sectional view showing an example of a first positioning part and a second positioning part.

FIG. 14 is a schematic cross-sectional view showing an example of a first positioning part and a second positioning part.

FIG. 15 is a schematic cross-sectional view showing an example of a first positioning part and a second positioning part.

FIG. 16 is a schematic partial cross-sectional view of a workpiece unit according to a third exemplary embodiment of the present disclosure.

FIG. 17 is a schematic plan view of a workpiece unit according to a fourth exemplary embodiment of the present disclosure.

FIG. 18 is a schematic cross-sectional view of the workpiece unit taken along line XVII-XVII of FIG. 17.

FIG. 19 is a schematic partial cross-sectional view of the workpiece unit according to the fourth exemplary embodiment of the present disclosure.

FIG. 20 is a schematic partial cross-sectional view of the workpiece unit according to the fourth exemplary embodiment of the present disclosure.

FIG. 21 is a schematic partial cross-sectional view of the workpiece unit according to the fourth exemplary embodiment of the present disclosure.

FIG. 22 is a schematic partial cross-sectional view of the workpiece unit according to the fourth exemplary embodiment of the present disclosure.

FIG. 23 is a schematic partial plan view of the workpiece unit according to the fourth exemplary embodiment of the present disclosure.

FIG. 24 is a schematic partial cross-sectional view of a workpiece unit according to a fifth exemplary embodiment of the present disclosure.

FIG. 25 is a schematic partial cross-sectional view of the workpiece unit according to the fifth exemplary embodiment of the present disclosure.

FIG. 26 is a schematic partial cross-sectional view of the workpiece unit according to the fifth exemplary embodiment of the present disclosure.

FIG. 27 is a schematic partial cross-sectional view of the workpiece unit according to the fifth exemplary embodiment of the present disclosure.

FIG. 28 is a schematic plan view of a workpiece unit according to a sixth exemplary embodiment of the present disclosure.

FIG. 29 is a schematic cross-sectional view of the workpiece unit taken along line XXVIII-XXVIII of FIG. 28.

FIG. 30 is a schematic plan view of a workpiece body showing an example of sections of a plane shape.

FIG. 31 is a schematic plan view of a workpiece body showing an example of sections of a plane shape.

FIG. 32 is a schematic plan view of a workpiece body showing an example of sections of a plane shape.

FIG. 33 is a schematic plan view of a workpiece body showing an example of sections of a plane shape.

FIG. 34 is a schematic plan view of a workpiece body showing another form of the workpiece body according to the sixth exemplary embodiment of the present disclosure.

FIG. 35 is a schematic side view of a workpiece body showing another form of the workpiece body according to the sixth exemplary embodiment of the present disclosure.

FIG. 36 is a schematic plan view of a workpiece unit according to a seventh exemplary embodiment of the present disclosure.

FIG. 37 is a schematic plan view of a section unit according to the seventh exemplary embodiment of the present disclosure.

FIG. 38 is a schematic plan view of a section unit of a form different from the form shown in FIG. 37.

FIG. 39 is a schematic plan view of a workpiece unit according to an eighth exemplary embodiment of the present disclosure.

FIG. 40 is a schematic plan view of a dummy workpiece body according to the eighth exemplary embodiment of the present disclosure.

FIG. 41 is a schematic plan view of the workpiece unit according to the eighth exemplary embodiment of the present disclosure.

DESCRIPTION OF MODES

In the following description, the reference numbers are added for better understanding of the invention without any intention to restrict the invention to the exemplary embodiments shown in the Drawings. In the individual exemplary embodiments, the same numbers are added to the same elements. The sizes and the size ratios in the Drawings are not intended to restrict the invention to the exemplary embodiments shown in the Drawings.

Preferred modes for the above aspects will be described below.

According to a preferred mode of the first aspect, a holding member is arranged continuously along an outer circumferential portion.

According to a preferred mode of the first aspect, a holding member has a ring-shape.

According to a preferred mode of the first aspect, a holding member is smaller in thickness than a workpiece body.

According to a preferred mode of the first aspect, a holding member is arranged centrally in the direction of the thickness of a workpiece body.

According to a preferred mode of the first aspect, a holding member is made up of two or more components.

According to a preferred mode of the first aspect, each of individual components of a holding member has a concave or convex portion. The individual components are so arranged that the concave portion and the convex portion are fitted with (engaged with) one another.

According to a preferred mode of the first aspect, a workpiece body is ceramic, metal or resin.

According to a preferred mode of the first aspect, a workpiece body is a pre-sintered body in which zirconia crystal grains have not completely been sintered.

According to a preferred mode of the first aspect, a holding member is plastic.

According to a preferred mode of the first aspect, a workpiece body has at least one worked item which is formed by working a workpiece body and is connected with an outer edge portion of the workpiece body.

According to a preferred mode of the second aspect, at the step of expanding a holding member, a holding member is heated to 60° C. to 150° C.

According to a preferred mode of the second aspect, a holding member comprises engineering plastic.

A workpiece unit (or assembly) according to a first exemplary embodiment of the present disclosure will be explained. FIG. 1 shows a workpiece unit in a schematic plan view. FIG. 2 shows the workpiece unit in a schematic cross-sectional view taken along line II-II of FIG. 1. FIG. 3 shows an area of a holding member in a schematic partial cross-sectional view.

A workpiece unit (or assembly) 10 has a workpiece body 1, and a holding member 2 arranged at least a part of a side wall of the workpiece body 1. A workpiece body 1 is worked for example by a working apparatus. For example in the field of dentistry, a dental product is produced from a workpiece body 1. As the dental product, for example, prosthesis such as a ceramic frame, a full-contour crown etc. can be enumerated. Preferably, a dental prosthesis has a tooth crown shape. Further, as the dental product, for example, a product for orthodontia (e.g., a bracket for orthodontia) and a product for dental implant (e.g., an abutment for dental implant) can be enumerated. A holding member 2 assists holding or fixing a workpiece unit 10 in a working apparatus. For example in a case of holding or fixing a workpiece unit in a working apparatus, at least a holding member 2 in the workpiece unit 10 is held by the working apparatus.

A workpiece body 1 has a first face 1a which serves as a face to be worked (to-be-worked face), a second face 1b opposite to the first face 1a, and an outer circumferential portion 1c arranged between the first face 1a and the second face 1b. Preferably, a first face 1a and a second face 1b are parallel or approximately parallel to each other. Preferably, a workpiece body 1 has a plane shape. In the exemplary embodiment shown in FIG. 1, the workpiece unit 10 and the workpiece body 1 have a circular plane shape but are not restricted to a circular one, and rather may have an elliptic, polygonal etc. plane shape.

A holding member 2 is arranged at at least a part of the outer circumferential portion 1c which corresponds to the side face of a workpiece body 1. A holding member 2 can cover at least a part of the outer circumferential portion 1c of a workpiece body 1 without interposition of an adhesive (material). An inner circumferential portion 2c of a holding member 2 and the outer circumferential portion 1c of a workpiece body 1 are directly contacted with each other at least partly. Preferably, a holding member 2 is arranged continuously along an outer circumferential portion 1c. Preferably, a holding member 2 has a shape corresponding to a plane shape of a workpiece body 1. A holding member 2 can have e.g. an annular, toroidal, tubular or ring shape. Preferably, a holding member 2 is arranged over the entire circumference of the side wall of a workpiece body 1. A gap (or space) may exist between a holding member 2 and a workpiece body 1.

A holding member 2 can have a first face 2a which is directed in the same direction as a first face 1a of a workpiece body 1 does, a second face 2b which is directed in the same direction as a second face 1b of the workpiece body 1 does, and an inner circumferential portion 2c which is arranged between the first face 2a and the second face 2b and faces in the direction of the outer circumferential portion 1c of the workpiece body 1. Preferably, a first face 2a of a holding member 2 and a first face 1a of a workpiece body 1 are parallel or approximately parallel to each other. A first face 2a of a holding member 2 can exist at a position on a side closer to a second face 1b of a workpiece body 1 than a first face 1a of a workpiece body 1 can. Likewise, a second face 2b of a holding member 2 can exist at a position on a side closer to a first face 1a of a workpiece body 1 than a second face 1b of a workpiece body 1 can. That is, it is preferable that a first face 1a of a workpiece body 1 and a first face 2a of a holding member 2 form a level difference (or a step). Preferably, a second face 1b of a workpiece body 1 and a second face 2b of a holding member 2 form a level difference. Preferably, the thickness t2 of a holding member 2 is thinner than the thickness t1 of a whole workpiece body 1. Hereby, alignment is facilitated when a workpiece unit 10 is fixed to a working apparatus.

Preferably, a holding member 2 is arranged centrally at a workpiece body 1 in the thickness direction of the workpiece body 1. That is, it is preferable that the center of a holding member 2 in its thickness direction and the center of a workpiece body 1 in its thickness direction overlap each other. Hereby, alignment is facilitated when a workpiece unit 10 is set in a working apparatus.

Preferably, a workpiece unit 10 is symmetrical with respect to the extending direction of a first face 1a and a second face 1b of a workpiece body 1. For example, it is preferable that a workpiece unit can be set in a working apparatus such that either one of a first face 1a and a second face 1b of a workpiece body 1 are (independently) directed toward a working tool (in general, toward the upper side).

The thickness t2 (height in FIG. 2) of a holding member 2 may be any arbitrary thickness unless the thickness prevents working of a workpiece body 1. Preferably, the thickness t2 of a holding member 2 is thinner than the thickness t1 of a workpiece body 1. This is adopted to facilitate holding a workpiece unit 10 in a working apparatus. The thickness t2 of a holding member 2 is preferably 1 mm or greater, more preferably 2 mm or greater, and even more preferably 4 mm or greater. This is adopted to keep the strength for supporting the unit by a working apparatus.

The width w1 (radial thickness or length) of a holding member 2 may be such a width that allows a workpiece unit 10 to be supported in a working apparatus.

As a material for a workpiece body 1, for example, ceramic, metal, resin etc. can be used. As an example of the ceramic, a material containing at least one of zirconia, alumina and crystallized glass can be enumerated. As examples of the metal, titanium, titanium alloy etc. can be enumerated. As examples of the resin, acrylic resin, methacrylic resin, ABS (acrylonitrile butadiene styrene) resin, polycarbonate, polypropylene, polystyrene, polyester, polyether ketone, Teflon (registered trade mark of polytetrafluoroethylene) etc. can be enumerated. Further, a composite material (a composite resin) made from (one of) these resins filled with an inorganic filler(s) can be enumerated as an example of the resin.

Where a workpiece body 1 is used for example for machining a dental product, the workpiece body 1 may be a zirconia pre-sintered body fired to such a state that the zirconia crystal grains therein have not completely been sintered. The zirconia pre-sintered body contains zirconia and a stabilizing agent which suppresses phase transition of zirconia crystal phase. For example, a stabilizing agent, when becoming a sintered body, suppresses phase transition of the crystal phase of the sintered body from tetragonal to monoclinic phase. As the stabilizing agent, oxides such as calcium oxide (CaO), magnesium oxide (MgO), yttrium oxide ($Y_2O_3$), cerium oxide ($CeO_2$) etc. can be enumerated. Preferably, a stabilizing agent is added in such an amount as to enable partial stabilization of tetragonal zirconia grains. For example in a case where yttria is used as the stabilizing agent, an yttria content is preferably 2 mol % to 8 mol %, more preferably 2.5 mol % to 6.5 mol %, with respect to the total molar number of zirconia and yttria. If a content of a stabilizing agent is excessively increased, phase transition can be suppressed but bending strength and fracture toughness are lowered. In contrast, a too low content of a stabilizing agent can suppress lowering of bending strength and fracture toughness but insufficiently suppresses progression of phase transition. It is to be noted that zirconia stabilized partially by addition of a stabilizing agent is called a partially stabilized zirconia. The content of a stabilizing agent in a zirconia sintered body can be measured by, e.g., inductively coupled plasma (ICP) emission spectrometry, fluorescence X-ray analysis etc.

The size d1 of a whole workpiece body 1 and the thickness t1 of the workpiece body 1 can be determined discretionally in accordance with purposes.

Preferably, a material of a holding member 2 is such a material that is not greatly deformed by pressure generated at the time of being fixed to a working apparatus. Further, it is preferable that a material of a holding member 2 is such a material that can be mounted on a workpiece body 1 by a method as explained below. As the material of a holding member 2, for example, engineering plastic, polypropylene, polystyrene, acryl resin, ABS (acrylonitrile butadiene styrene) resin, polycarbonate, polyester, polyether ketone, Teflon (registered trademark), metal, wood etc. can be used. Further, the above examples of the resin can also include a composite material (a composite resin) made from resin filled with an inorganic filler(s).

A holding member 2 can be provided with information. For example, a holding member 2 can be provided at a visible position with information in the form of symbols such as letters, barcodes etc. by means of printing, engraving, a seal etc. The information includes, for example, lot number, color tone (shade), contraction factor (shrinkage factor), distinction between upper and lower sides etc.

A method of producing a workpiece unit according to the first exemplary embodiment will be explained.

First, a workpiece body 1 is made. Partially stabilized zirconia powder which is zirconia particles containing a stabilizing agent is prepared. The type and concentration of the stabilizing agent can be selected discretionally. A suitable particle size and particle size distribution of zirconia crystal particles are selected discretionally. As a method of adding a stabilizing agent to the zirconia particles, a suitable method can be discretionally selected such as a hydrolysis method, a neutralizing coprecipitation method, an alkoxide method, a solid phase method etc. As required, an additive is added to the prepared partially stabilized zirconia powder followed by mixing. Where wet mixing is used, a resulting composition (or formulation) is dried.

Next, the composition (or formulation) is pressure-formed to a predetermined shape. For example, the composition is pressure-formed to the shape of the workpiece body 1. As the pressure-forming method, a suitable method can be discretionally selected. The applied pressure may be, for example, 20 MPa or more. After the pressure-forming, the composition for sintering may be further subjected to CIP (Cold Isostatic Pressing), e.g., under a pressure of 150 MPa or more. After the pressure-forming, the formed body may be worked to a desired shape by cutting, grinding etc.

Then, the formed body is fired at a temperature which does not sinter the zirconia grains, thereby forming a pre-sintered body. A condition for pre-sintering may be, for example, 800° C. to 1200° C. as a pre-sintering temperature and 1 hour to 12 hours as a resident time for keeping the temperature. The pre-sintered body may be worked to a desired shape by cutting, grinding etc. For example, instead of (the composition) being formed to the shape of a workpiece body 1 at the time of forming, it may be performed that after completion of a pre-sintered body the pre-sintered body is formed to the shape of a workpiece body 1 (forming of a protrusion portion). Hereby, a workpiece body 1 is manufactured.

Then, a holding member 2 is prepared. A method of making a holding member 2 is not restricted to a specific one. For example, a holding member 2 can be made by injection molding, extrusion molding, cutting (machining) etc. In a case of a holding member 2 of a ring shape, the holding member 2 is expanded by heating, for example. A heating temperature of a holding member 2 can be discretionally determined according to a material of the holding member 2. For example where a holding member 2 is an engineering plastic, the heating temperature of the holding member 2 is preferably 60° C. or greater, more preferably 80° C. or greater. Further, the heating temperature of a holding member 2 is preferably 150° C. or lower, and may be, for example, not higher than 120° C. or not higher than 100° C. Next, the workpiece body 1 is inserted into the holding member 2 under such a state that the holding member 2 is expanded. Then, the holding member 2 and the workpiece body 1 are aligned, followed by cooling the holding member 2. The holding member 2 is contracted by cooling. Hereby, the holding member 2 is mounted on the workpiece body 1 (a so-called shrinkage-fit operation). According to this method, a holding member 2 can be mounted on (or attached to) a workpiece body 1 without using an adhesive.

FIG. 4 and FIG. 5 show in a schematic cross-sectional view of a workpiece unit an example of a workpiece unit after a workpiece body 1 is worked. FIG. 4 is a schematic partial cross-sectional view in an area of a holding member. A workpiece unit 10 is set to a working apparatus, and a workpiece body 1 is worked by cutting etc. to form a worked item (or worked article) 4. The worked item 4 can be machined under such a state that an outer edge portion 1e of the workpiece body 1 remains in the shape of a frame, and the worked item 4 is connected to the outer edge (or periphery) portion 1e. The worked item 4 is, for example, a dental product as described above. By forming the worked item 4, a cut portion which has been subjected to cutting is formed in the workpiece body 1. The outer edge portion 1e is formed along the outer circumferential portion 1c by forming the worked item 4 and the cut portion 5. The outer edge portion 1e is a working margin and functions as a frame for the worked item 4. The worked item 4 is connected to the outer edge portion 1e via a connection portion 4a. The shape of a first positioning portion as described below is preferably of such a shape that does not provide an adverse effect such as falling of the worked item 4 after working.

According to the first exemplary embodiment, a holding member 2 is mounted on a workpiece body 1 without using an adhesive. Hereby, the force generated by the heat expansion of a holding member 2 is not transmitted to the workpiece body 1 via the adhesive, and thus it is possible to suppress occurrence of a problem (e.g., fracture of a workpiece body 1 or a worked item) which results from a difference between thermal expansion coefficients of a workpiece body 1 and a holding member 2. Further, where it is desired to remove the holding member 2 from the workpiece body 1 after working, the holding member can be easily removed from the workpiece body 1.

Moreover, by using a holding member 2 instead of a holding portion formed in a workpiece body 1 itself in order to hold the workpiece body 1 in a working apparatus, a mold for making the workpiece body 1 can be downsized by the width of the holding member 2, as a result of which an amount of row material used for making the workpiece body 1 can be reduced. If a cost of the workpiece body 1 is higher than that of the holding member 2, production costs of the workpiece unit 10 and the worked item 4 can be reduced.

A workpiece unit according to a second exemplary embodiment of the present disclosure will be explained. FIG. 6 shows in a schematic partial cross-sectional view a workpiece unit according to the second exemplary embodiment. FIG. 7 shows in a schematic exploded cross-sectional view a workpiece body and a holding member.

In a workpiece unit 20 according to the second exemplary embodiment, a workpiece body 21 has at least one first positioning portion 21d at an area of its outer circumferential portion 1c [sic. 21c] which area faces a holding member 22. The holding member 22 has at least one second positioning portion 22d at an area of its inner circumferential portion 22c which area faces a workpiece body 21. A first positioning portion 21d and a second positioning portion 22d are portions for determining the position of a holding member 22 with respect to the workpiece body 21. The first positioning portion 21d and the second positioning portion 22d can suppress occurrence of positioning deviation of the holding member 22 with respect to the workpiece body 21.

The first positioning portion 21d and the second positioning portion 22d can be arranged at positions where they correspond to each other. The first positioning portion 21d and the second positioning portion 22d can have shapes corresponding to each other. For example, it is preferable that the first positioning portion 21d and the second positioning portion 22d have such positions and shapes that allow at least a part of one to fit into (or on) the other. In the exemplary embodiment shown in FIG. 6 and FIG. 7, the first positioning portion 21d is formed as a concave portion. The second positioning portion 22d is formed as a convex portion which fits into the concave portion of the first positioning portion 21d. Positions of the first positioning portion 21d and the second positioning portion 22d may be any portions where the outer circumferential portion 21c of the workpiece body 21 and an inner circumferential portion 22c of a holding member 22 face each other.

Preferably, a convex portion is such that at least a part thereof can be inserted into a concave portion. Preferably, a convex portion has such a shape and a size that allows it to contact with the opening and/or the inner wall of a concave portion when it is inserted into the concave portion. For example, it is preferable that the width (e.g., the size in the direction (the vertical direction in the figure) connecting the first face 21a and the second face 21b of the workpiece body 21) of the convex portion is greater than the width (the size in the vertical direction) of the concave portion. Hereby, the first positioning portion 21d and the second positioning portion 22d are fitted or engaged with each other, as a result of which positioning deviation of the holding member 22 with respect to the workpiece 21 can be suppressed.

FIG. 8 to FIG. 1 show in schematic plan views examples of a first positioning portion 21d and a second positioning portion 22d. Although FIG. 8 to FIG. 11 show (merely) plan views of first positioning portions 21d, second positioning portions 22d have plane shapes corresponding to the shapes of the first positioning portions 21d. Thus, illustration and explanation of second positioning portions 22d will be omitted. The first positioning portion 21d can be formed as a continuous groove portion as shown for example in FIG. 8 and FIG. 9. A first positioning portion 21d may be a linear groove portion as shown in FIG. 8, or a zigzag or meander groove portion as shown in FIG. 9. A first positioning portion 21d can be formed as a concave portion (e.g. a conical or columnar one) of the shape of at least one partial or discontinuous point or an intermittent groove portion(s) as shown, e.g., in FIG. 10 and FIG. 1. A dotted line formed (connecting) of the first positioning portions 21d may be linear as shown in FIG. 100 or a zigzag- or meander-fashion as shown in FIG. 11. FIG. 8 to FIG. 1l show first positioning portions 21d having a regular shape, but the first positioning portion 21d may have an irregular shape.

Although in the exemplary embodiment shown in FIG. 6 and FIG. 7, the first positioning portion 21d and the second positioning portion 22d have one triangular cross section, but the first positioning portion 21d and the second positioning portion 22d can have other cross-sectional shapes. FIG. 12 to FIG. 15 show in schematic partial cross-sectional views examples of the first positioning portion 21d and the second positioning portion 22d. For example, the first positioning portion 21d and the second positioning portion 22d can have a polygonal (such as tetragonal etc.) cross section as shown in FIG. 12. As shown in FIG. 13, the first positioning portion 21d can have a semicircular, semielliptical etc. cross-sectional shape (a hemispherical shape). In this regard, the second positioning portion 22d may have a semicircular, semielliptical etc. cross-sectional shape (a hemispherical shape) as the first positioning portion 21d does, or a shape different (a triangular shape in FIG. 13) from that of the first positioning portion 21d as shown in FIG. 13. As shown in FIG. 14, a part(s) of the second positioning portion 22d may be engaged with the first positioning portion 21d. In the example shown in FIG. 14, the width w22 of the second positioning portion 22d is greater than the width w21 of the first positioning portion 21d. A part of the second positioning portion 22d is inserted into the first positioning portion 21d and the first positioning portion 21d and the second positioning portion 22d are contacted with each other partially at the upper and lower ends (edges) of the first positioning portion 21d. In this case, an outer circumferential portion 21c of the workpiece body 21 and an inner circumferential portion 22c of the holding member 22 may not be contacted with each other. Alternatively, as shown in FIG. 14, the holding member 22 may be deformed by its contraction and partially contact with an outer circumferential portion 21c of the workpiece body 21 at the upper and lower ends of the inner circumferential portion 22c, for example. Further, as shown in FIG. 15, the first positioning portion 21d and the second positioning portion 22d can have a plurality of concave or convex portions in one cross section.

Preferably, the first positioning portion 21d and/or the second positioning portion 22d has such a depth and/or a height that allows the first positioning portion 21d and the second positioning portion 22d to engage with each other. The depth and/or the height of the first positioning portion 21d and the second positioning portion 22d can be, for example, 0.5 mm or more.

A method of producing a workpiece unit 20 can be the same as the production method according to the first exemplary embodiment.

Other formulations (or formations) of the second exemplary embodiment than those described above can be the same as those of the first exemplary embodiment. The second exemplary embodiment can be combined with at least one of the above-mentioned exemplary embodiments within a possible range.

The second exemplary embodiment can have the same or similar effect as the first exemplary embodiment.

According to the second exemplary embodiment, the holding member 22 can be mounted on (or attached to) the workpiece body 21 at a suitable position by joining the first positioning portion 21d and the second positioning portion 22d. Further, also after the holding member 22 is mounted on the workpiece body 21, the first positioning portion 21d and the second positioning portion 22d act as a slip stopper, as a result of which positioning deviation of the holding member 22 with respect to the workpiece body 21 can be suppressed.

A workpiece unit (or assembly) according to a third exemplary embodiment of the present disclosure will be explained. FIG. 16 shows in a schematic partial cross-sectional view a workpiece unit according to the third exemplary embodiment.

In the second exemplary embodiment, the first positioning portion of the workpiece body is a concave portion and the second positioning portion of the holding member is a convex portion. In a workpiece unit according to the third exemplary embodiment, the concave portion and the convex portion are arranged at the workpiece body 21 and the holding member 22 in a reverse relationship. That is, a first positioning portion 21f arranged at an outer circumferential portion 21c of a workpiece body 21 is a convex portion. A second positioning portion 22f arranged at an inner circumferential portion 22c of a holding member 22 is a concave portion corresponding to the first positioning portion 21f.

A method of producing a workpiece unit 30 can be the same as the production method according to the first exemplary embodiment.

Other formulations of the third exemplary embodiment than those described above can be the same as or similar to those of the first and second exemplary embodiments. The third exemplary embodiment can be combined with at least one of the above exemplary embodiments within a possible range.

The third exemplary embodiment can have the same effect as the first and second exemplary embodiments.

A workpiece unit (or assembly) according to a fourth exemplary embodiment of the present disclosure will be explained. FIG. 17 shows a workpiece unit in a schematic plan view. FIG. 18 shows in a schematic cross-sectional view the workpiece unit taken along line XVII-XVII of FIG. 17. FIG. 19 shows in a schematic partial cross-sectional view the workpiece unit at an area of a holding member.

In a workpiece unit 40 according to the fourth exemplary embodiment, a workpiece body 41 further has a protrusion portion 41c in addition to the structure of the first exemplary embodiment. A holding member 2 is arranged at least a part of the protrusion portion 41c.

A workpiece body 41 has a first face 41a used as a to-be-worked face, and a second face 41b opposite to the first face 41a. Preferably, a first face 41a and a second face 41b are parallel or approximately parallel to each other. Preferably, the workpiece body 41 has a plane shape. In the exemplary embodiment shown in FIG. 17, the workpiece unit 40 and the workpiece body 41 have circular plane shapes, but are not restricted to a circular shape and may have an elliptic, polygonal etc. plane shape.

The workpiece body 41 has a protrusion portion 41c along at least a part of the side wall, i.e. at the outer edges of a first face 41a and a second face 41b or an outer circumferential portion 41g between the first face 41a and the second face 41b. Preferably, a protrusion portion 41c is a portion for holding or supporting a workpiece unit 40 in a working apparatus. Preferably, the protrusion portion 41c exists in a region where working is not performed by a working apparatus. Preferably, the protrusion portion 41c is disposed continuously along the entire circumference of an outer circumferential portion 41g of the workpiece body 41. That is, it is preferable that the protrusion portion 41c has a ring or toroidal shape. The protrusion portion 41c can have such a formulation as to protrude from the side face of the workpiece body 41. For example, a protrusion portion 41c protrudes from between a first face 41a and a second face 41b of a workpiece body 41 in a direction approximately perpendicular to the first face 41a and the second face 41b. Further, a protrusion portion 41c exists at an outer circumferential portion 41g of a workpiece body 41 and has such a formulation that the end portion of the workpiece body 41 is thinner than the other portion(s) thereof.

A protrusion portion 41c can have a third face 41d which is directed in the same direction as the first face 41a does, and a fourth face 41e which is directed in the same direction as the second face 41b does. The protrusion portion 41c can have a fifth face 41f which connects the third face 41d and the fourth face 41e. Preferably, the third face 41d and the fourth face 41e are parallel or approximately parallel to each other. Preferably, the third face 41d and the first face 41a are parallel or approximately parallel to each other. Preferably, the fourth face 41e and the second face 41b are parallel or approximately parallel to each other. Preferably, the third face 41d and the fifth face 41f are perpendicular or approximately perpendicular to each other. Preferably, the fourth face 41e and the fifth face 41f are perpendicular or approximately perpendicular to each other. Preferably, the first face 41a and the second face 41b are perpendicular or approximately perpendicular to the fifth face 41f. Preferably, the thickness t12 of the protrusion portion 41c is smaller than the thickness t11 of a whole workpiece body 41. That is, it is preferable that the first face 41a and the third face 41d form a level difference (or a step). Preferably, the second face 41b and the fourth face 41e form a level difference. Hereby, alignment is facilitated when a workpiece unit 40 is fixed to a working apparatus. In addition, the first face 41a and the third face 41d may be formed in the same plane. Further, the second face 41b and the fourth face 41e may be formed in the same plane.

The thickness t12 of the protrusion portion 41c is preferably 1 mm or greater, more preferably 2 mm or greater, and still more preferably 4 mm or greater. This is adopted to hold (or support) a workpiece unit 40 at the time of working and strengthen (reinforce) the workpiece body 41 after working.

The width w11 of the protrusion portion 41c is preferably 2 mm or smaller, more preferably 1.7 mm or smaller, and still more preferably 1.5 mm or smaller. The reason is that if the width w11 of a protrusion portion 41c is too great, waste part of a workpiece body 41 is increased. Further, the width w11 of the protrusion portion 41c is preferably 0.3 mm or greater, more preferably 0.4 mm or greater, still more preferably 0.6 mm or greater, and even still more preferably 0.8 mm or greater. The reason is that the protrusion portion 41c has a function of strengthening the workpiece body 41 after working, and thus the protrusion portion 41c needs a certain width in order to strengthen the workpiece body 41 after working.

Preferably, a protrusion portion 41c is disposed centrally at the workpiece body 41 in the thickness direction of the workpiece body 41. That is, it is preferable that the center of the protrusion portion 41c in its thickness direction overlaps with the center of the workpiece body 41 in its thickness direction. Hereby, alignment is facilitated when a workpiece unit 40 is set to a working apparatus.

The size d12 of the whole workpiece body 41, and the size d13 of the first face 41a and the second face 41b of the workpiece body 41 used as a to-be-worked face can be discretionally determined according to purposes.

A holding member 2 is arranged at least a part of the outer side of a protrusion portion 41c. Preferably, the holding member 2 is arranged at least in the protrusion direction of a protrusion portion 41c. Preferably, a holding member 2 is arranged continuously along the fifth face 41f which serves as a side face of a protrusion portion 41c. That is, a holding member 2 can cover at least a part of the fifth face 41f of the protrusion portion 41c. The fifth face 41f of the protrusion portion 41c and an inner circumferential portion 2c of a holding member 2 face each other. The fifth face 41f of the protrusion portion 41c and the inner circumferential portion 2c of the holding member 2 are in direct contact with each other at least partly. Preferably, the first face 2a of the holding member 2 and the third face 41d of the workpiece body 41 are parallel or approximately parallel to each other. Preferably, the second face 2b of the holding member 2 and the fourth face 41e of the workpiece body 41 are parallel or approximately parallel to each other.

A third face 41d of the protrusion portion 41c and a first face 2a of the holding member 2 can be formed in the same plane. Likewise, the fourth face 41e of the protrusion portion 41c and a second face 2b of the holding member 2 can be formed in the same plane. The reason is that the holding member 2 and the protrusion portion 41c overlap each other completely. In this case, the thickness t13 of the holding member 2 is identical to the thickness t12 of the protrusion portion 41c. Alternatively, the first face 2a of the holding member 2 can exist at a position closer to the first face 41a of the workpiece body 41 than the third face 41d of a protrusion portion 41c can. Likewise, the second face 2b of the holding member 2 can exist at a position closer to the second face 41b of the workpiece body 41 than the fourth face 41e of the protrusion portion 41c can. The reason is that it is facilitated to hold (or support) the workpiece unit 40 in a working apparatus. In this case, the thickness t13 of the holding member 2 is greater than the thickness t12 of the protrusion portion 41c.

The thickness 113 of the holding member 2 may be any arbitrary thickness unless the thickness prevents working of the workpiece body 41. The thickness t13 of the holding member 2 is preferably smaller than the thickness t1 of the workpiece body 41, and more preferably substantially equivalent to the thickness t12 of the protrusion portion 41c. The reason is that it is facilitated to hold (or support) the workpiece unit in a working apparatus. The thickness t13 of the holding member 2 is preferably 1 mm or greater, more preferably 2 mm or greater, and still more preferably 4 mm or greater. The reason is that the strength of holding (or supporting) by the working apparatus is kept.

Preferably, holding (or supporting) in a working apparatus is performed by a portion where the protrusion portion 41c and the holding member 2 are just engaged (abutted) each other. Accordingly, it is preferable that the width w12 of the holding member 2 has such a size that a total size of the width w12 and the width w11 of a protrusion portion 41c in the abutted state allows holding (or supporting) in a working apparatus.

A method of producing the workpiece unit 40 can be the same as the production method according to the first exemplary embodiment.

As the formulations of the protrusion portion and the holding member, formulations different from those shown in FIG. 17 to FIG. 19 can be adopted. FIG. 20 to FIG. 23 show other examples of a protrusion portion and a holding member.

In a workpiece unit 50 shown in FIG. 20, a holding member 52 is arranged so as to cover not only the fifth face 41f of the protrusion portion 41c, but also at least a part of a third face 41d and a fourth face 41e. That is, the holding member 52 can have on a side directed to the workpiece body 41 a groove portion for accommodating the protrusion portion 41c. The holding member 52 can be arranged so as to fit the protrusion portion 41c into the groove portion.

Preferably, the width w14 of the protrusion portion 41c is the same as the width w11 shown in FIG. 18. Preferably, the width (w14+w15) of a holding member 52 is the same as the width (w11+w12) shown in FIG. 18. Preferably, the thickness t14 of the protrusion portion 41c is 1 mm or greater in order to secure the strength. Preferably, the thickness t15 of the holding member 52 is equal to or smaller than the thickness of the workpiece body 41 in order to perform holding (or supporting) in a working apparatus.

In a workpiece unit 60 shown in FIG. 21, a holding member 62 can be arranged so as to cover the fifth face 41f of a protrusion portion 41c and either of the third face 41d and the fourth face 41e thereof. In the exemplary embodiment shown in FIG. 21, the holding member 62 is arranged so as to cover the third face 41d and the fifth face 41f of the protrusion portion 41c.

The holding member 62 has a first face 62a which is directed in the same direction as the second face 41b of the workpiece body 41 and the fourth face 41e do. Preferably, the holding member 62 is arranged such that the first face 62a is formed in the same plane as the fourth face 41e of the protrusion portion 41c, or exists at a position closer to the second face 41b than the fourth face 41e of the protrusion portion 41c. This aims at stabilizing attachment of the workpiece unit 60 to a working apparatus. Preferably, the holding member 62 is arranged at the workpiece body 41 centrally in its thickness direction. In this case, the position of the protrusion portion 41c can be shifted from the central position of the workpiece body 41 in its thickness direction.

Preferably, the width w16 of the protrusion portion 41c is the same as the width w1 shown in FIG. 18. Preferably, the width (w16+w17) of the holding member 62 is the same as the width (w1 [sic. w11]+w2 [sic. w12]) shown in FIG. 18. Preferably, the thickness t16 of a protrusion portion 41c is 1 mm or greater in order to secure the strength. Preferably, the thickness t17 of the holding member 62 is equal to or smaller than the thickness of the workpiece body 41 in order to perform holding (or supporting) in a working apparatus.

In a workpiece unit 70 shown in FIG. 22 and FIG. 23, a holding member 72 is made up of two or more components. FIG. 23 is a plan view observed from the side face of the holding member 72. In the exemplary embodiment shown in FIG. 22 and FIG. 23, the holding member 72 has a first portion 72a which covers a third face 41d of a protrusion portion 41c and a second portion 72b which covers a fourth face 41e of the protrusion portion 41c. A fifth face 41f of the protrusion portion 41c is covered (enclosed) with the first portion 72a and the second portion 72b. The first portion 72a and the second portion 72b each have at least one engagement portion on the side facing the fifth face 41f of the protrusion portion 41c. For example, the first portion 72a and the second portion 72b are arranged such that a concave portion and a convex portion are fitted with each other on the side of the fifth face 41f of the protrusion portion 41c. In the exemplary embodiment shown in FIG. 23, the demarcation line between the first portion 72a and the second portion 72b extends in a meander fashion.

Preferably, the first portion 72a and the second portion 72b are such that their regions where the concave portions and the convex portions are formed have the same shape. Preferably, a whole first portion 72a and a whole second portion 72b have the same shape. Preferably, the first portion 72a and the second portion 72b are of the same component. This can simplify production and management of the holding member 72.

According to the exemplary embodiment shown in FIG. 22 and FIG. 23, an engagement portion(s) is(are) provided at each portion of the holding member 72, as a result of which positioning deviation of each portion can be prevented. The holding member 72 is made up of a plurality of components, as a result of which mounting the holding member 72 on a workpiece body 41 (attaching the holding member 72 to a workpiece body 41) can be made easy.

In the exemplary embodiment shown in FIG. 22, the protrusion portion is provided. However, also in an exemplary embodiment in which such a protrusion portion is not provided, the holding member 2 can be made up of two or more components.

Other formulations of the fourth exemplary embodiment than those described above can be the same as those of the first exemplary embodiment. The fourth exemplary embodiment can be combined with at least one of the above exemplary embodiments within a possible range.

The fourth exemplary embodiment can have the same effect as the first exemplary embodiment.

The formulation of a workpiece body 41 after working is the same as that shown in FIG. 4 and FIG. 5. However, a workpiece body 41 after working further has protrusion portion 41c at an outer edge portion 1e. A worked item 4 is connected to at least one of an outer edge portion 1e and a protrusion portion 41c. Even if after working, as shown in FIG. 4 and FIG. 5, the outer edge portion of a workpiece body 41 becomes thinner in width and thus only the outer edge portion cannot secure sufficient strength, a workpiece unit 40 according to the present disclosure can reinforce the outer edge portion of a workpiece body 41 by a protrusion portion 41c. That is, the thickness of an outer edge portion of a workpiece body 41 can be partly secured by a protrusion portion 41c. This can suppress fracture of a workpiece body 41 even if, after working, an impact is given to the workpiece body 41. Further, provision of a protrusion portion 41c can enlarge an allowable range of positioning deviation in attachment of a workpiece unit 40 to a working apparatus.

A workpiece unit (or assembly) according to a fifth exemplary embodiment of the present disclosure will be explained. The fifth exemplary embodiment is combined with the second and third exemplary embodiments and the fourth exemplary embodiment. FIG. 24 to FIG. 27 show in schematic partial cross-sectional views workpiece units according to the fifth exemplary embodiment. FIG. 24 to FIG. 27 each show an example of the fifth exemplary embodiment.

In a workpiece unit 80 shown in FIG. 24, the first positioning portion and the second positioning portion presented by the second and third exemplary embodiments are applied to the formulation shown in FIG. 19 according to the fourth exemplary embodiment. A first positioning portion 41h of a workpiece body 41 can be arranged on a fifth face 41f of a protrusion portion 41c. A second positioning portion 22d of a holding member 22 can be arranged at a position corresponding to a first positioning portion 41h. Formulations of the first positioning portion 41h and the second positioning portion 22d can be the same as those of the second and third exemplary embodiments.

In a workpiece unit 90 shown in FIG. 25, the first positioning portion and the second positioning portion presented by the second and third exemplary embodiments are applied to the formulation shown in FIG. 20 according to the fourth exemplary embodiment. A first positioning portion 41h of a workpiece body 41 can be arranged on a fifth face 41f of a protrusion portion 41c. A second positioning portion 52a of a holding member 52 can be arranged at a position corresponding to the first positioning portion 41h. Formulations of the first positioning portion 41h and the second positioning portion 52a can be the same as those of the second and third exemplary embodiments.

In a workpiece unit 100 shown in FIG. 26, the first positioning portion and the second positioning portion presented by the second and third exemplary embodiments are applied to the formulation shown in FIG. 21 according to the fourth exemplary embodiment. A first positioning portion 41h of a workpiece body 41 can be arranged on a fifth face 41f of a protrusion portion 41c. A second positioning portion 62b of a holding member 62 can be arranged at a position corresponding to a first positioning portion 41h. Formulations of the first positioning portion 41h and the second positioning portion 62b can be the same as those of the second and third exemplary embodiments.

In a workpiece unit 100 shown in FIG. 27, the first positioning portion and the second positioning portion presented by the second and third exemplary embodiments are applied to the formulation shown in FIG. 22 according to the fourth exemplary embodiment. A first positioning portion 41h of a workpiece body 41 can be arranged on a fifth face 41f of a protrusion portion 41c. A second positioning portion 72c of a holding member 72 can be arranged at a position corresponding to the first positioning portion 41h. Formulations of the first positioning portion 41h and the second positioning portion 72c can be the same as those of the second and third exemplary embodiments.

As to each of the formulations of the fifth exemplary embodiment, such a formulation that the first positioning portion of the workpiece body is concave and the second positioning portion of the holding member is convex is shown. Also in each formulation of the fifth exemplary embodiment, the concave portion and the convex portion can be arranged at the workpiece body and the holding member in a reverse relationship, as is the case of the third exemplary embodiment. That is, the first positioning portion arranged at the protrusion portion of the workpiece body can have a convex portion, and the second positioning portion arranged at the inner circumferential portion of the holding member can have a concave portion (whose illustrations are omitted).

As to each formulation of the fifth exemplary embodiment, such a formulation that the first positioning portion of the workpiece body exists at the fifth face of the protrusion portion is shown. However, the first positioning portion can be arranged at at least one of the third and fourth faces of the protrusion portion. The second positioning portion can be arranged at a position corresponding to the first positioning portion.

A method of producing a workpiece unit according to the fifth exemplary embodiment can be the same as the production method according to the first exemplary embodiment.

Other formulations of the fifth exemplary embodiment than those described above can be the same as those of the first to fourth exemplary embodiments. The fifth exemplary embodiment can be combined with at least one of the above exemplary embodiments within a possible range.

The fifth exemplary embodiment can have the same effect as the first to fourth exemplary embodiments.

A workpiece unit (or assembly) according to a sixth exemplary embodiment of the present disclosure will be explained. In the sixth exemplary embodiment, a workpiece body has a plurality of components. FIG. 28 shows in a schematic plan view a workpiece unit according to the sixth exemplary embodiment. FIG. 29 shows in a schematic cross-sectional view the workpiece unit taken along line XXVIII-XXVIII of FIG. 28.

In a workpiece unit 140, a workpiece body 141 is physically divided into a plurality of sections 142. One workpiece body 141 is configured in combination of a plurality of sections 142. Among a plurality of sections 142, at least two sections 142 may differ in composition. For example, individual sections 142 can contain coloring materials different from one another. At least two sections 142 of a plurality of sections 142 can be identical in composition, and all sections 142 may have the same composition. Main materials of individual sections 142 may be identical to or different from one another. Preferably, one section 142 is smaller than such a size that it can be held or fixed in a working apparatus.

At least one of a plurality of sections 142 can be a part which is worked by a working apparatus. At least one of a plurality of sections 142 can be a part which is not worked by a working apparatus. At least one of a plurality of sections 142 can be a dummy workpiece body for compensating for a size (or shape) of a workpiece body 141 thereby making the workpiece body 141 have such a size that it can be held in a working apparatus.

Preferably, a workpiece body 141 is divided by individual sections 142 so as to divide a first face 141a and a second face 141b of the workpiece body 141. The number of sections 142 in a workpiece body 141 can be determined discretionally. A size of one section 142 can be discretionally adjusted according to demand etc. such as an individual composition etc. A plurality of sections 142 may differ in size or have the same size.

At least one section 142 can have at least a part of a protrusion portion 141c of a workpiece body 141. The formulation of a protrusion portion 141c can be the same as those of the above exemplary embodiments. A protrusion portion 141c can be connected by combining a plurality of sections 142.

A shape of each section 142 may be an any arbitrary one. A plurality of sections 142 may differ in shape or have the same shape. In a case of the plane shape of a workpiece body 141 being circular, it is preferable that the workpiece body 141 is so divided that (boundary of) a section(s) 142 pass(es) through the center of the circle. For example, a section(s) 142 can have a fan-like plane shape(s). In a case of sections 142 having fan shapes, it is preferable that the radiuses of the fan shapes are identical to each other. As a result, a workpiece body 141 having a circular or elliptic shape can be formed by combining (or assembling) a plurality of sections 142 in a radial manner such that the individual arcs thereof are connected in a consecutive manner. Preferably, the total of the central angles of a plurality of sections 142 is 360°. Each fan-shape may have an arbitrary central angle, which can be, for example, 45°, 60°, 90°, 120°, 180° (i.e. a semi-circle, semi-ellipse etc.), 240°, 270°, 300°, 315° etc.

Preferably, a plurality of sections 142 have the same thickness. As a result, both a first face 141a and a second face 141b can be formed as a plane. Further, this facilitates alignment in the thickness direction when a workpiece unit 140 is fixed in a working apparatus.

In the exemplary embodiment shown in FIG. 28 and FIG. 29, a workpiece body 141 has a first section 142a, a second section 142b, and a third section 142c. The first section 142a, the second section 142b and the third section 142c have the same shape. The first section 142a, the second section 142b and the third section 142c have the same size. The first section 142a, the second section 142b and the third section 142c have a plane shape both faces of which are of a fan shape. The central angle of the fan shape is 120°. The first section 142a, the second section 142b and the third section 142c are arranged in a radial manner and thus form a circular workpiece body 141. Both faces of the first section 142a, the second section 142b and the third section 142c are each arranged in the same plane, and the first face 141a and the second face 141b are formed as a plane.

FIG. 30 to FIG. 33 show in schematic plan views workpiece bodies presenting examples of plane shapes of sections. FIG. 30 to FIG. 33 show states in which sections from which one workpiece body is assembled are separated from each other. In a formulation shown in FIG. 30, sections 142a, 142b, 142c have a fan-like plane shape having a central angle of 120°. In a formulation shown in FIG. 31, sections 142a, 142b have a semi-circular plane shape. In a formulation shown in FIG. 32, a section 142a has a semi-circular plane shape whereas sections 142b, 142c have a fan-like plane shape having a central angle of 90°. In the formulations shown in FIG. 30 to FIG. 32, the radiuses of the individual sections are of the same size. In a formulation shown in FIG. 33, sections 142a-f do not have a fan-like plane shape but are formed so as to make up a circular shape in the assembled state.

FIG. 34 shows in a schematic plan view a workpiece body presenting another formulation of a workpiece body. As to sections 142 adjacent to each other, the sections 142 may be in direct contact with each other. Alternatively, as shown in FIG. 34, a workpiece body 141 may further have a buffer (or a buffering material) 143 in at least a part between the adjacent sections 142. Preferably, a buffer 143 is such a material that is able to absorb irregularities at the end face of sections 142. A buffer 143 may be an adhesive which joins sections 142. For the buffer 143, a resin sheet, for example, may be used. In the formulation shown in FIG. 34, a buffer 143 provided totally between sections 142 is shown. However, a buffer 143 may be provided partially between sections 142. Use of a buffer 143 makes it possible to suppress poor alignment caused by irregularities at the end faces of sections 142 when they are combined (or assembled). Further, use of an adhesive as a buffer 143 makes it possible to increase the strength for junction of sections 142.

FIG. 35 shows in a schematic side view a workpiece body presenting another formulation of a workpiece body. A section 142 can have an engagement portion which engages with an adjacent section 142 at the end face which faces the adjacent section 142. As shown in FIG. 35, an engagement portion can be formed for example as a concave portion 142g which is formed at the end face of a section 142a, and a convex portion 142h which is formed at the end face of a section 142b and engages with the concave portion 142g. A workpiece body 141 may further have a buffer 143 as shown in FIG. 34 in addition to engagement portions. Provision of engagement portions makes it possible to increase the strength for junction of sections 142.

In a case where a section 142 is a section which is not worked (a dummy workpiece body), any arbitrary material of such strength that allows a workpiece unit 140 to be held in a working apparatus and permits a section 142 for working to be worked can be used in addition to the above mentioned materials, as a material of the section 142 which is not worked.

Other formulations of the sixth exemplary embodiment than those described above can be the same as those of the first to fifth exemplary embodiments. The sixth exemplary embodiment can be combined with at least one of the above exemplary embodiments within a possible range.

The sixth exemplary embodiment can have the same effect as the first to fifth exemplary embodiments.

According to the sixth exemplary embodiment, a workpiece body can have a plurality of sections which differ in composition. Each section can be adjusted as to its size and shape according to needs. This makes it possible to increase an efficiency of use of a workpiece body and reduce waste portions of a workpiece body. Further, a workpiece body can be produced and sold on a section basis. Moreover, a worked item having different compositions can be produced by using a working apparatus in a single operation.

A workpiece unit (or assembly) according to a seventh exemplary embodiment of the present disclosure will be explained. FIG. 36 shows in a schematic plan view a workpiece unit in the seventh exemplary embodiment. FIG. 37 shows in a schematic plan view a section unit in the seventh exemplary embodiment. In the sixth exemplary embodiment one holding member is applied to the sections whereas in the seventh exemplary embodiment a part of a holding member is arranged for each section.

A workpiece unit 150 according to the seventh exemplary embodiment has a plurality of section units 151. Each section unit 151 has a section 142 and a covering member 152 which is arranged at at least the side face of the section 142. A section 142 can be the same as that of the sixth exemplary embodiment. A size of one section unit 151 can be smaller than a size which allows it to be held in a working apparatus.

In a formulation shown in FIG. 37, a covering member 152 encloses an outer circumferential portion (a side face) of a section 142. The covering member 152 can be the same as the holding member in the first to sixth exemplary embodiments except that it encloses one section. When a plurality of section units 151 are combined (or assembled) to form a workpiece unit 150, the covering members 152 form a holding member which is held by a working apparatus. A part of one covering member 152 forms a part of the holding member. By combining a plurality of section units 151, the parts of the covering members 152 are connected to form a holding member which encloses the combination of the sections 142. For example in a case of the section 142 being a fan shape, a portion of the covering member 152 which is arranged at the arc portion of the section 142 constitutes a holding member. A portion of the covering member 152 which does not constitute a holding member can function as a buffer portion which makes junction between adjacent sections smooth.

Section units 151 can be joined to each other with an adhesive (not shown). Alternatively, engagement portions which engage covering members 152 with each other may be provided at an area where the covering members 152 face each other.

FIG. 38 shows in a schematic plan view a section unit of a formulation different from the formulation shown in FIG. 37. In the formulation shown in FIG. 37, a covering member is arranged over the entire periphery of a section. In a section unit 153 according to the formulation shown in FIG. 38, a covering member 154 is arranged merely at a part of the side face of a section 142. Section units 153 can make up a workpiece unit as shown in FIG. 28 by being assembled in the same manner as shown in FIG. 36. A covering member 154 is arranged at a portion where it acts as a holding member by assembling section units. In the formulation shown in FIG. 38, the covering member 154 is arranged along the arc portion of the section 142. A portion of the side face of the section 142 which portion faces the adjacent section 142 in assembly of the section units 153 is not provided with a covering member 154. The section unit 153 shown in FIG. 38 has the same formulation of the section unit shown in FIG. 37, except that the position where the covering member 154 is arranged is different.

Section units 153 can be jointed to each other with an adhesive (not shown). Alternatively, engagement portions which engage sections 142 with each other may be provided at an area where the sections 142 face each other.

Other formulations of the seventh exemplary embodiment than those described above can be the same as those of the first to sixth exemplary embodiments. The seventh exemplary embodiment can be combined with at least one of the above exemplary embodiments within a possible range.

The seventh exemplary embodiment can have the same effect as the first to sixth exemplary embodiments. Because the section units can be produced or sold independently, a user can produce or buy a section unit according to the needs to arbitrarily determine a combination of compositions in a workpiece unit.

A workpiece unit (or assembly) according to an eighth exemplary embodiment of the present disclosure will be explained. FIG. 39 shows in a schematic plan view a workpiece unit in the eighth exemplary embodiment. FIG. 40 shows in a schematic plan view a dummy workpiece body in the eighth exemplary embodiment. In the seventh exemplary embodiment the workpiece unit is composed by assembling a plurality of section units. In the eighth exemplary embodiment a workpiece unit 160 is composed using one section unit.

A workpiece unit 160 has a section unit 151 and a dummy workpiece body 161. A section unit 151 is the same as the section unit 151 according to the seventh exemplary embodiment. A dummy workpiece body 161 compensates for a size (or shape) of the section unit 151 and allows the section unit 151 to be held in a working apparatus. A dummy workpiece body 161 can have a holding portion 161a for being held in a working apparatus. The holding portion 161a has the same function as a holding member. The holding portion 161a may be formed integrally as a part of a dummy workpiece body 161 or as a separate member thereof. In the formulation shown in FIG. 39 and FIG. 40, the dummy workpiece body 161 has such a plane shape that three section units 151 are assembled. In the formulation shown in FIG. 39 and FIG. 40, the dummy workpiece body 161 has such a plane shape as to form a circle by being assembled with the section unit 151.

A shape and a size of a dummy workpiece body 161 can be designed according to a shape and size of a section unit 151. A dummy workpiece unit 161 has such a thickness that it can be held in a working apparatus. Material of a dummy workpiece body 161 may be any arbitrary material which allows a section to be held and worked in a working apparatus. As the material of a dummy workpiece body 161, the same material as that of a holding member can be used, for example.

A dummy workpiece body 161 and a section unit 151 can be jointed to each other with an adhesive (not shown). Alternatively, engagement portions which engage a dummy workpiece body 161 and a section unit 151 with each other may be provided at an area where the dummy workpiece body 161 and the section unit 151 face each other.

Preferably, the dummy workpiece body 161 can be used repeatedly. Preferably, the section unit 151 is attachable to and removable from a dummy workpiece body 161.

FIG. 41 shows in a schematic plan view a workpiece unit of a formulation different from the formulation shown in FIG. 39. A workpiece unit 163 has a section (a workpiece body) 144, a dummy workpiece body 164 to hold the section 144, and an adhesive 145 to joint the section 144 and the dummy workpiece body 164. The dummy workpiece body 164 has a toroidal or tubular structure which has an opening formed (cut out) in a size of the section 144. The dummy workpiece body 164 can have a holding portion 164*a* for holding in a working apparatus. In the formulation shown in FIG. 41, the section 144 is fitted into the opening of the dummy workpiece body 164 concentrically, and jointed by the adhesive 145. A size (e.g. a radius) of a section 144 can be 80% or smaller, 60% or smaller, 50% or smaller, or 40% or smaller of a size which allows it to be held in a working apparatus.

Preferably, the dummy workpiece body 164 has such a strength that allows it not to be deformed when being worked by a working apparatus.

Other formulations of the eighth exemplary embodiment than those described above can be the same as those of the first to seventh exemplary embodiments. The eighth exemplary embodiment can be combined with at least one of the above exemplary embodiments within a possible range.

The eighth exemplary embodiment can have the same effect as the first to seventh exemplary embodiments. In is unnecessary to size the workpiece body up to such an extent that it can be held (or supported) in a working apparatus. Hereby, even a composition having a low demand can be worked with no need of a workpiece body(s) of other composition(s).

A workpiece unit (or assembly) according to a ninth exemplary embodiment of the present disclosure will be explained. In the sixth exemplary embodiment the sections are physically separated from each other. In contrast, in the ninth exemplary embodiment at least two sections in a workpiece body cannot be physically separated and formed integrally. A schematic plan view and a schematic cross-sectional view of a workpiece unit in the ninth exemplary embodiment can be the same as those of FIG. 28 and FIG. 29.

Preferably, adjacent sections 142 are connected with each other. Accordingly, it is preferable that materials of adjacent sections 142 are those which can be connected (or bound) to each other by firing, and are identical in main material. For example, adjacent sections 142 can be zirconia which are different from each other in type and/or content of an additive such as a coloring agent etc.

A method of producing a workpiece body according to the ninth exemplary embodiment is the same as the production method according to the above exemplary embodiment(s) except that a plurality of sections are formed integrally. A workpiece body is formed as follows. First, removable partition(s) is(are) provided in a mold, thereby forming a mold for sections of a desired shape(s). The partition(s) is(are) located on the boundary (boundaries) between the sections. Next, a composition (or formulation) is provided in the area of each section, followed by removing the partition(s). Then, the compositions (or formulations) are formed under pressure, as a result of which a formed body made from the integrated plural compositions can be formed. A method performed after the firing of the formed body is the same as in the above exemplary embodiment.

Other formulations of the ninth exemplary embodiment than those described above can be the same as those of the first to eighth exemplary embodiments. The ninth exemplary embodiment can be combined with at least one of the above exemplary embodiments within a possible range.

The ninth exemplary embodiment can have the same effect as the first to eighth exemplary embodiments. Further, a member for holding a plurality of sections such as a holding member, an adhesive etc. is not necessary.

The disclosure of the patent literature as mentioned above is incorporated herein by reference thereto. It is to be noted that the workpiece unit and the production method according to the present invention are described based on the above-described exemplary embodiments but not restricted thereto. Rather, it is possible for the workpiece unit and the production method to include various types of variations, modifications or improvements of a wide variety of the disclosed elements (including the individual elements of the individual claims, the individual elements of the individual exemplary embodiments or examples, the individual elements of the individual figures etc.) within the whole disclosure of the present invention (including the Claims and the Drawings) and based on the basic technical concept of the present invention. Further, it is possible to perform various combinations, replacements or selections of a wide variety of the disclosed elements (including the individual elements of the individual claims, the individual elements of the individual exemplary embodiments or examples, the individual elements of the individual figures etc.) within the whole disclosure of the present invention.

Further problems, purposes and developments of the present invention are self-explanatory also from the whole disclosure of the present invention.

Particularly, any numerical ranges disclosed herein should be so interpreted that any intermediate values or sub-ranges falling within the disclosed ranges are also concretely disclosed even without specific recital thereof.

A part or the entire of the aforementioned exemplary embodiments can be stated also as the following remarks (termed "mode" or "modes"), but not restricted thereto.

[Mode 1]

A workpiece unit (or assembly) (to-be-worked unit or assembly), comprising:

a workpiece body (to-be worked body) having a protrusion portion, and a holding member arranged at at least a part of the outer side of the protrusion portion.

[Mode 2]

A workpiece unit according to the mode, wherein the workpiece body has a plate shape, the protrusion portion protrudes from the side face of the workpiece body, and the holding member is arranged at least in a protrusion direction of the protrusion portion.

[Mode 3]

A workpiece unit according to the mode(s), wherein the workpiece body has a first face, a second face arranged opposite to the first face, and an outer circumferential portion between the first face and the second face, and the protrusion portion is arranged at the outer circumferential portion.

[Mode 4]

A workpiece unit according to the mode(s), wherein the protrusion portion is arranged continuously along the outer circumferential portion of the workpiece body, and the holding member has a ring shape.

Mode 5

A workpiece unit according to the mode(s), wherein the protrusion portion has a third face directed in the same direction as the first face, a fourth face directed in the same direction as the second face, and a fifth face connecting the third face and the fourth face, and the holding member covers at least a part of the fifth face.

Mode 6

A workpiece unit according to the mode(s), wherein the holding member has a first face directed in the same direction as the third face of the protrusion portion and a second face directed in the same direction as the fourth face of the protrusion portion.

Mode 7

A workpiece unit according to the mode(s), wherein the first face of the holding member is formed in the same plane as the third face of the protrusion portion or exists at a position closer to the first face of the workpiece body than the third face of the protrusion portion does.

Mode 8

A workpiece unit according to the mode(s), wherein the second face of the holding member is formed in the same face as the fourth face of the protrusion portion or exists at a position closer to the second face of the workpiece body than the fourth face of the protrusion portion does.

Mode 9

A workpiece unit according to the mode(s), wherein the holding member further covers at least a part of the third face and the fourth face of the protrusion portion.

Mode 10

A workpiece unit according to the mode(s), wherein the workpiece body has at least one first positioning portion in an area of the protrusion portion which area faces the holding member, and the holding member has a second positioning portion which is engaged with at least a part of the first positioning portion.

Mode 11

A workpiece unit (or assembly) (to-be-worked unit or assembly, comprising:
a workpiece body (to-be worked body) and
a holding member arranged at at least a part of the outer circumferential portion of the workpiece body,
wherein
the workpiece body has at least one first positioning portion in an area thereof which area faces the holding member, and the holding member has a second positioning portion which is engaged with at least a part of the first positioning portion.

Mode 12

A workpiece unit according to the mode(s), wherein the first positioning portion has a concave or convex shape, the second positioning portion has a shape which is fitted (mated) or engaged with the first positioning portion, and at least a part of one of the first positioning portion and the second positioning portion is fitted (mated) or engaged with at least a part of the other thereof.

Mode 13

A workpiece unit according to the mode(s), wherein one of the first positioning portion and the second positioning portion has a concave shape and the other thereof has a convex shape,
the width of the convex shape is greater than the width of the concave shape, and
a part of the convex shape is inserted into the concave shape.

Mode 14

A workpiece unit according to the mode(s), wherein the first positioning portion is arranged over the entire circumference of the workpiece body.

Mode 15

A workpiece unit according to the mode(s), wherein the first positioning portion or the second positioning portion has a groove shape.

Mode 16

A workpiece unit according to the mode(s), wherein the first positioning portion or the second positioning portion has a cone- or column shape.

Mode 17

A workpiece unit according to the mode(s), wherein the workpiece body has a protrusion portion protruding from the outer circumferential portion,
the first positioning portion is arranged at the protrusion portion, and
the holding member is arranged at least in the protrusion direction of the protrusion portion.

Mode 18

A workpiece unit according to the mode(s), wherein the protrusion portion is arranged continuously along the outer circumferential portion of the workpiece body, and the holding member has a ring shape.

Mode 19

A workpiece unit according to the mode(s), wherein the workpiece body has a first face, and a second face arranged opposite to the first face,
the outer circumferential portion is arranged between the first face and the second face,
the protrusion portion has a third face directed in the same direction as the first face, a fourth face directed in the same direction as the second face, and a fifth face connecting the third face and the fourth face, and
the holding member covers at least a part of the fifth face.

Mode 20

A workpiece unit according to the mode(s), wherein the holding member has a first face directed in the same direction as the third face of the protrusion portion and a second face directed in the same direction as the fourth face of the protrusion portion.

Mode 21

A workpiece unit according to the mode(s), wherein the first face of the holding member is formed in the same face as the third face of the protrusion portion or exists at a position closer to the first face of the workpiece body than the third face of the protrusion portion does.

Mode 22

A workpiece unit according to the mode(s), wherein the second face of the holding member is formed in the same face as the fourth face of the protrusion portion or exists at a position closer to the second face of the workpiece body than the fourth face of the protrusion portion does.

Mode 23

A workpiece unit according to the mode(s), wherein the holding member further covers at least a part of the third face and the fourth face of the protrusion portion.

Mode 24

A workpiece unit according to the mode(s), wherein the holding member is made up of two or more components.

Mode 25

A workpiece unit according to the mode(s), wherein each of the individual components of the holding member has a concave or convex portion, and the individual components are so arranged that the concave portion and the convex portion are fitted (mated) with one another.

Mode 26

A workpiece unit according to the mode(s), wherein the workpiece body is ceramic, metal or resin.

Mode 27

A workpiece unit according to the mode(s), wherein the workpiece body is a pre-sintered body in which zirconia crystal grains have not completely been sintered.

Mode 28

A workpiece unit according to the mode(s), wherein the protrusion portion is a part of the pre-sintered body.

Mode 29

A workpiece unit according to the mode(s), wherein the holding member is jointed (jointed) to the workpiece body by means of an adhesive (material).

Mode 30

A workpiece unit according to the mode(s), wherein the holding member and the workpiece body are directly contacted with each other.

Mode 31

A workpiece unit according to the mode(s), wherein the holding member is plastic.

Mode 32

A workpiece unit according to the mode(s), wherein the protrusion portion is approximately identical in thickness with the holding member.

Mode 33

A workpiece unit according to the mode(s), wherein the width of the protrusion portion in the protrusion direction is 0.3 mm to 2 mm.

Mode 34

A workpiece unit according to the mode(s), wherein the protrusion portion is arranged centrally in the thickness direction of the workpiece body.

Mode 35

A workpiece unit according to the mode(s), wherein the workpiece body has a worked item which is formed by working the workpiece body and is connected with the protrusion portion or an outer edge portion of the workpiece body.

Mode 36

A workpiece unit (or assembly), comprising:
a workpiece body (to-be-worked body) having a plurality of sections, the sections partitioning a face to be worked (to-be-worked face) of the workpiece body.

Mode 37

A workpiece unit according to the mode(s), wherein a plurality of the sections are integrally formed.

Mode 38

A workpiece unit according to the mode(s), wherein a plurality of the sections have compositions different from each other.

Mode 39

A workpiece unit according to the mode(s), further comprising a holding member which encloses at least the outer circumferential portion of the workpiece body.

Mode 401

A workpiece unit according to the mode(s), wherein the workpiece body is divided into each section.

Mode 41

A workpiece unit according to the mode(s), wherein at least two of a plurality of the sections have compositions different from each other.

Mode 42

A workpiece unit according to the mode(s), wherein the section has a shape which is engaged with an adjacent section.

Mode 43

A workpiece unit according to the mode(s), further comprising a buffer (a buffering material) arranged between adjacent sections.

Mode 44

A workpiece unit according to the mode(s), wherein the buffer comprises a resin.

Mode 45

A workpiece unit according to the mode(s), further comprising a holding member which encloses at least the outer circumferential portion of the workpiece body.

Mode 46

A workpiece unit according to the mode(s), wherein the holding member maintains the combination (set) of a plurality of the sections.

Mode 47

A workpiece unit according to the mode(s), wherein the holding member is made up of a plurality of portions (or segments), and
the portions (or segments) of the holding member are arranged respectively at the sections of the workpiece body.

Mode 48

A workpiece unit according to the mode(s), further comprising a covering member which encloses the outer circumferential portion of the section.

Mode 49

A workpiece unit according to the mode(s), wherein the portion (or segment) of the holding member is at least a part of the covering member.

Mode 50

A workpiece unit according to the mode(s), wherein the covering member has a shape which is engaged with a covering member enclosing an adjacent section.

Mode 51

A workpiece unit according to the mode(s), wherein the plane shape of the section has a fan shape.

Mode 52

A workpiece unit according to the mode(s), wherein a plurality of the sections are combined (or assembled) to form the workpiece body having a circular plane shape.

Mode 53

A workpiece unit according to the mode(s), wherein a plurality of the sections have the same shape.

Mode 54

A workpiece unit according to the mode(s), wherein one of a plurality of the sections is an area which is not worked by means of a working apparatus.

Mode 55

A workpiece unit according to the mode(s), wherein one of the sections is smaller than a size fixable to a working apparatus.

Mode 56

A method of producing a workpiece unit (or assembly) (to-be-worked body or assembly), comprising:
preparing a workpiece body (to-be-worked body) having a first positioning portion at its outer circumferential portion,
preparing a holding member having a second positioning portion, and mounting the holding member on the outer circumferential portion of the workpiece body so as to make the first positioning portion and the second positioning portion correspond (mate) to each other.

Mode 57

A method of producing a workpiece unit (or assembly) (to-be-worked body or assembly), comprising:
preparing a plurality of sections which serve as elements of a workpiece body (to-be-worked body),
forming the workpiece body having a first face, a second face arranged opposite to the first face and an outer circumferential portion between the first face and the second face by combining (or assembling) a plurality of the sections,
preparing a holding member having a ring shape,
expanding the holding member by heating,
inserting the workpiece body into the ring of the holding member, and mounting the holding member on (or attaching the holding member to) the outer circumferential portion of the workpiece body by contracting the holding member by cooling.

Mode 58

A method of producing a workpiece unit according to the mode(s), wherein
the first positioning portion is a concave or convex portion, and
at the step of mounting the holding member, the first positioning portion and the second positioning portion are fitted (mated) with each other.

Mode 59

A method of producing a workpiece unit according to the mode(s), wherein
the step of mounting the holding member comprises:
expanding the holding member having a ring shape by heating, inserting the workpiece body into the ring of the holding member, and contracting the holding member by cooling.

Mode 60

A method of producing a workpiece unit according to the mode(s), wherein
the workpiece body has a protrusion portion protruding from the outer circumferential portion, and
the first positioning portion is arranged at the protrusion portion.

Mode 61

A method of producing a workpiece unit according to the mode(s), wherein
at the step of expanding the holding member, the holding member is heated to 60° C. to 150° C.

Mode 62

A method of producing a workpiece unit according to the mode(s), wherein
the holding member comprises engineering plastic.

INDUSTRIAL APPLICABILITY

The present disclosure is applicable to, e.g., production of dental prosthesis.

REFERENCE SIGNS LIST 10, 20, 30, 40, 50, 60, 70, 80, 90, 100, 110, 140, 150, 160, 163 workpiece unit (or assembly)
1, 21, 41, 141 workpiece body
1a, 21a, 41a, 141a first face
1b, 21b, 41b, 141b second face
1c, 21c. 41g outer circumference portion
1d, 21d, 21f, 41h first positioning portion
1e outer edge portion
2, 22, 52, 62, 72 holding member
2a, 22a, 62a first face
2b, 22b second face
2c, 22c inner circumferential portion
2d, 22d, 22f, 52a, 62b, 72c second positioning portion
4 worked item (or article)
4a connection portion
5 cut portion
41c, 141c protrusion portion
41d third face
41e fourth face
41f fifth face
72a first portion
72b second portion
142, 144 section
142a to 142f first to sixth section
142g concave portion
142h convex portion
143 buffer (buffering material)
145 adhesive (adhesive material)
151, 153 section unit
152, 154 covering member
161, 164 dummy workpiece body
161a, 164a holding portion

The invention claimed is:
1. A workpiece unit, comprising:
a workpiece body formed from a first material with a first thermal expansion coefficient; and
a holding member formed from a second material with a second thermal expansion coefficient, the second thermal expansion coefficient being larger than the first expansion coefficient,
wherein the workpiece body has a first face, a second face arranged opposite to the first face, and outer circumferential sidewalls between the first face and the second face;
wherein the holding member has a first holding face, a second holding face opposite to the first face, and inner circumferential sidewalls between the first holding face and the second holding face, the inner circumferential sidewalls sized and shaped to surround the workpiece body and substantially match at least a portion of the outer circumferential sidewalls;
wherein the holding member is configured to thermally expand by heating to allow the workpiece to be inserted inside the holding member and thermally contract with the removal of heat and secure the inner circumferential sidewalls to at least a portion of the outer circumferential sidewall with contraction stress of the holding member against the workpiece body without adhesive; and
wherein the holding member is configured to be removable from the workpiece body by thermally expanding the holding member by heating both the holding member and the workpiece body.

2. The workpiece unit according to claim 1, wherein the holding member has a ring-shape.

3. The workpiece unit according to claim 2, wherein the holding member is smaller in thickness than the workpiece body.

4. The workpiece unit according to claim 1, wherein the holding member is smaller in thickness than the workpiece body.

5. The workpiece unit according to claim 1, wherein the holding member is arranged centrally in the direction of the thickness of the workpiece body.

6. The workpiece unit according to claim 1, wherein the holding member is made up of two or more components.

7. The workpiece unit according to claim 6, wherein:
each of the individual components of the holding member has a concave or convex portion, and
the individual components are so arranged that the concave portion and the convex portion are fitted with one another.

8. The workpiece unit according to claim 1, wherein the workpiece body is ceramic, metal or resin.

9. The workpiece unit according to claim 1, wherein the workpiece body is a pre-sintered body in which zirconia crystal grains have not completely been sintered.

10. The workpiece unit according to claim 1, wherein the holding member is plastic.

11. The workpiece unit according to claim 1, wherein the workpiece body has at least one worked item which is formed by working the workpiece body and is connected with an outer edge portion of the workpiece body.

12. The workpiece unit according to claim 1, wherein the workpiece body has at least one first positioning portion on the outer circumferential sidewalls, and
wherein the holding member has at least one second positioning portion on the inner circumferential sidewalls.

13. The workpiece unit according to claim 12, wherein the at least one first positioning portion of the workpiece body is one of a projection or a recess, and wherein the at least one second positioning portion of the holding member is the other one of a projection or a recess.

14. The workpiece unit according to claim 13, wherein the at least one first positioning portion of the workpiece body and the at least one second positioning portion of the holding member are arranged at a corresponding position on the outer circumferential sidewalls and the inner circumferential sidewalls respectively so that the projection of one of the workpiece body or holding member and the recess of the other one of the workpiece body or holding member are fitted with one another.

15. A method of producing a workpiece unit, the workpiece unit, comprising: a workpiece body formed from a first material with a first thermal expansion coefficient; and a holding member formed from a second material with a second thermal expansion coefficient, the second thermal expansion coefficient being larger than the first expansion coefficient, wherein the workpiece body has a first face, a second face arranged opposite to the first face, and outer circumferential sidewalls between the first face and the second face; wherein the holding member has a first holding face, a second holding face opposite to the first face, and inner circumferential sidewalls between the first holding face and the second holding face, the inner circumferential sidewalls sized and shaped to surround the workpiece body and substantially match at least a portion of the outer circumferential sidewalls; wherein the holding member is configured to thermally expand by heating to allow the workpiece to be inserted inside the holding member and thermally contract with the removal of heat and secure the inner circumferential sidewalls to at least a portion of the outer circumferential sidewall with contraction stress of the holding member against the workpiece body without adhesive; and wherein the holding member is configured to be removable from the workpiece body by thermally expanding the holding member by heating both the holding member and the workpiece body, the method comprising:

expanding the holding member by heating, said holding member of a ring shape;

inserting the workpiece body into the ring of the holding member; and mounting the holding member at the outer circumferential sidewalls of the workpiece body by contracting the holding member by cooling.

16. The method of producing a workpiece unit according to claim 15, wherein, during the expanding of the holding member, the holding member is heated to 60° C. to 150° C.

17. The method of producing a workpiece unit according to claim 15, wherein the holding member comprises engineering plastic.

* * * * *